| A(I) | L | ℓ | C.V. |
|---|---|---|---|
| 2 | 1590 | 1440 | 229 |
| 3 | 1560 | 1440 | 225 |
| 2 | 2070 | 1480 | 224 |
| 2 | 1590 | 1410 | 224 |
| 2 | 2100 | 1450 | 221 |
| 4 | 2040 | 1480 | 220 |
| 2 | 1560 | 1410 | 220 |

Fig. 4a.

| A(I) | L | ℓ | C.V. | n |
|---|---|---|---|---|
| 2 | 1590 | 1440 | 229 | 1 |
| 3 | 1560 | 1440 | 225 | |
| 2 | 1590 | 1410 | 224 | |
| 2 | 1560 | 1410 | 220 | |
| 2 | 2070 | 1480 | 224 | 2 |
| 2 | 2100 | 1450 | 221 | |
| 4 | 2040 | 1480 | 220 | |

Fig. 4b.

Jan. 20, 1970   J. A. VALEMBOIS ET AL   3,490,320
METHOD FOR OBTAINING PATTERNS FOR CUTTING PIECES
OUT OF SHEETS OR STRIPS
Filed Dec. 7, 1967   12 Sheets-Sheet 6

INVENTORS
Jean Valembois &
Jean-Marie Couvreur
BY Spencer & Kaye
ATTORNEYS

United States Patent Office 3,490,320
Patented Jan. 20, 1970

3,490,320
METHOD FOR OBTAINING PATTERNS FOR CUTTING PIECES OUT OF SHEETS OR STRIPS
Jean Adolphe Valembois, Woluwe-St.-Lambert, and Jean-Marie Couvreur, Moustier-sur-Sambre, Belgium, assignors to Glaverbel, Watermael-Boitsfort, Belgium
Filed Dec. 7, 1967, Ser. No. 688,809
Claims priority, application Luxembourg, Dec. 13, 1966, 52,576
Int. Cl. B26d *3/08, 5/30*
U.S. Cl. 83—39
22 Claims

ABSTRACT OF THE DISCLOSURE

A method for cutting pieces of predetermined dimensions from a sheet or strip so as to make optimum utilization of the sheet or strip material by establishing cutting schemes using the most valuable pieces compatible with the dimensions of the sheet or strip, successively dividing the sheet or strip into smaller panels by successive lengthwise and crosswise cutting lines, testing each pattern to determine the total value of pieces laid out as a function of the total sheet or strip area utilized, modifying the pattern one part at a time to obtain a large number of alternate patterns, and using at least part of that pattern producing he best yield as an actual cutting pattern.

BACKGROUND OF THE INVENTION

This invention relates to a method for cutting material in sheet, strip or ribbon form into a number of pieces whose dimensions are predetermined by the data contained in an order book. The term "order book" is here intended to mean any compilation of the number and dimensions of the various pieces which must be produced.

In many industries, the material from which the finished product is to be obtained is manufactured in the form of a continuous strip or ribbon after one or more consecutive processing operations, this being true, for example, in metallurgy, for the production of sheet metal, in the glass-making industry and in the plastics and paper-making industries. The resulting strip or ribbon is then cut into a number of pieces, or articles, which have various dimensions, the various sizes in fact constituting the items of an order book which is the product of the centralization of a number of orders from customers. Such pieces are the actual finished product of the particular producing industry or organization.

As a rule, the continuous strip or ribbon is systematically cut up into sheets all having the same dimensions, simply by cutting the sheet at right angles to its direction of travel as the sheet advances, whereafter the sheets are removed to a subsequent treatment station where they are cut up into pieces of various sizes as specified in the order book. Cutting is undertaken by a team of several workers. Each worker is assigned to selected ones of the pieces included in the order book and must produce his assigned pieces while making optimum use of the sheets and while taking into account any flaws present therein. If the number of possible combinations of the various pieces to be produced, the ways of arranging such pieces and the choice of cutting lines to be made to form a cutting pattern for the sheets are considered, it results that the number of possible cutting patterns which can be worked out by any one person is in fact bound to be limited. Consequently, cutting efficiency is a long way from what could be achieved in theory if the totality of sizes represented by the order book and all possible cutting patterns could be considered simultaneously.

If output is small and the number of order book sizes is not too great, the situation is still tolerable, but it ceases utterly to be so in the case where high strip outputs are required to fill the needs of voluminous order books without undue delays. Cutting efficiency is, in such cases, further diminished by the fact that each individual engaged in cutting deals with a proportionally smaller variety of piece sizes, the number of sheets cut per person remaining substantially constant.

To improve this situation, it has been suggested that patterns be used which group a large number of pieces appropriately disposed relative to one another, and to cut the strip in accordance with the patterns. The patterns are prepared once for permanent use from data relating to the required pieces.

This cutting procedure, although helping to increase the cutting rate, presents certain disadvantages. Once the pattern has been prepared, it can be used only for a strip or ribbon whose width is at least equal to the width for which the pattern was designed. This gives rise to some lack of flexibility, as, for instance, when cutting a glass strip or ribbon which very often has variations in its usable width as a result of the circumstances under which it was manufactured.

Also, when the required pieces have widely varying dimensions, a large number of patterns containing all possible size combinations must be provided. The preparation of a large number of patterns is very expensive and does not provide an adequate guarantee that it will result in optimum cutting, primarily because the operator will find it more difficult to choose the optimum cutting format as the number of predetermined patterns is increased, and the time saved in cutting is actually offset by the time wasted in pattern selection. Also, this method of cutting soon becomes impossible to employ when flaws present in the material to be cut must also be taken into consideration.

SUMMARY OF THE INVENTION

It is an object of the present invention to provide a cutting process which is free from most of the disadvantages mentioned and which determines the cutting patterns in a quite different manner.

Another object of the present invention is to determine the best possible cutting pattern for a sheet or strip.

Still another object of the invention is to determine the best possible pattern devised in a predetermined period of time.

Yet another object of the invention is to devise cutting patterns which take into account the relative values of the pieces to be cut.

These and other objects according to the present invention are achieved in a method for cutting a sheet or strip of material into a number of rectangular pieces of predetermined dimensions based on the contents of an order book, which cutting takes the form of cuts of successive ranks $m$ starting from a first rank cut extending across one entire dimension of the piece and finishig with an $n$th rank cut, each rank other than the first rank defining cuts perpendicular to those of the next lower-number rank and each rank cut extending between either two cuts of the next lower-number rank or one cut of the next lower-number rank and one edge of the sheet or strip, each cut dividing the sheet portion across which it extends into at least one panel and/or desired piece whose rank $m$ is the same as that of such cut, by a procedure for development of a scheme for cutting the sheet or strip. This procedure includes the steps of:

Placing, during development of the scheme, in an existing panel of the highest-number rank $m$, a piece whose dimensions are taken from the order book and whose dimensions are compatible with the coordinates of the flaws present in the sheet or strip, while leaving unused any panel or rank ($m-1$) resulting from the placing of a desired piece of rank $m$ and requiring cuts of ranks ($m-1$) and $m$; selecting, for such piece whose dimensions are taken from the order book, those cuts having the ranks required to remove such piece from the sheet or strip; repeating the steps of placing and selecting for each successively produced panel of rank $m$ until reaching a cut of rank $n$, whereby an initial partial cutting scheme is thus devised by varying $m$ from 1 towards $n$;

Then eliminating selected pieces, consecutively, in order of decreasing rank number and thus in the reverse order of their placement, from the partial cutting scheme thus obtained; devising, for each unused panel resulting from the elimination of each piece, a cutting scheme based on an arrangement of at least one piece whose dimensions are taken from the order book, with allowance for the flaw coordinates, the rank of the cuts required to remove such at least one piece not exceeding $n$; and reiterating the steps of eliminating and devising for each consecutive piece of rank $m$ proceeding in a direction from ranks $n$ towards 1 from the highest-number rank attained in the design of the initial partial cutting scheme;

Deriving, during each elimination of a piece of rank $m$ whenever such elimination affects a piece whose fabrication required a cut of rank ($m-1$), an initial partial cutting scheme, and modifying the same for any panels of rank ($m-1$) which had remained unused, by repeating the steps of placing, selecting, repeating, eliminating, devising and reiterating for each such unused panel before eliminating such piece of rank $m$ and before devising cutting schemes for the restored panel resulting from the elimination of such piece $m$; and Cutting the sheet or strip in accordance with at least some part of a cutting scheme thus obtained.

By "arrangement of at least one piece whose dimensions are taken from the order book" there must be understood a combination or collection of pieces whose dimensions are taken from the order book, or a single piece which is to replace the piece to be eliminated, or the eliminated piece itself positioned in a different manner.

Various criteria can be applied to the selection of the cutting scheme for cutting up the sheet, or strip, or ribbon, but as a general rule all the criteria have as their aim optimum use of cutting. For instance, the particular scheme which is retained can be, as well as the scheme providing optimum use of the area of the sheet to be cut, the scheme giving the minimum number of cutting lines or the scheme giving the largest number of pieces having the same dimensions, or so on.

One very interesting criterion is to retain the scheme for which the ratio between the sum of the numerical values representing, preferably, the manufacturing costs of the pieces in the scheme, or pattern, or plan, and the total area used in the sheet, or strip, or ribbon is the greatest.

To this end, every piece in the order book is first allotted a numerical value representing the cost price of the article. The cost price depends upon the geometric efficiency of cutting, which can be determined for each piece in the light of prior experience, and which can be modified in proportion as data about cutting conditions are obtained. The advantage of a cutting optimization criterion based on the cost of each piece is that it is an optimization based on economic efficiency. This cost criterion will be retained hereinafter, but the invention is not, of course, limited to this single criterion.

Preferably, the various consecutive schemes are devised, and the best scheme selected, in accordance with the particular criterion chose, through the agency of a computer. In this case, the scheme-devising procedure as hereinbefore described forms the basis for programming the computer. The computer then delivers at its output a particular cutting scheme which it has retained. The computer output can control either a printer, which delivers the cutting scheme in plain language, or it can deliver signals in a form to directly control tracing elements or cutting tools. The computer output or the particular cutting scheme retained can be recorded on a secondary record carrier such as a magnetic tape or a punched tape for controlling the tracing or cutting tools, or on a film on which an image of the actual cutting scheme appears, possibly in reduced form, in the form of a network of lines which can be projected onto the material to be cut to serve as a guide for the cutting operator.

Nor will the scope of the invention be exceeded if the scheme-devising procedure is applied to an imaginary or model order book and to imaginary or model sheets or an imaginary or model strip or ribbon similar to the actual order book and sheets or strip or ribbon, respectively. These similar or analogous order books etc. can be obtained, for instance, by a simple reduction in certain dimensions.

Since the number of schemes which can be prepared is very high, it is advantageous to obtain, fairly rapidly, if not the one best cutting scheme, at least some of the cutting schemes close to the best. Accordingly, the initial partial cutting schemes are designed to include order book pieces having the highest possible cost-representing numerical values.

For the same reason, the pieces which form the "arrangements of at least one piece" and which are intended for an unused panel resulting from the elimination of one piece from a provisional scheme, are preferably in order of decreasing numerical values.

When the various schemes are being devised, it is vital that all of the possible schemes for at least one of the ways of placing and cutting each piece can be devised. To this end, the order book pieces of predetermined dimensions are classified in a number of lines in decreasing order of cost-representing numerical values. For developing the schemes, the order book thus classified is scanned line by line, whereas to devise schemes by forming arrangements of at least one piece taken from the order book in order to replace an eliminated piece, the order book thus classified is scanned line by line starting from the line corresponding to the piece being eliminated.

In practice, order book scanning can be speeded up if it is considered that the pieces to be cut are intended for handling units, such as frames or stands, boxes, etc. Very often, each handling unit is required to receive only pieces of very similar dimensions and having in most cases also very similar cost-representing numerical values. Such pieces are disposed in consecutive lines in an order book in which the pieces are classed in decreasing order of the last-mentioned values. Consequently, a piece eliminated during a modification of a partial scheme is replaced by a very similar piece or pieces in the subsequent schemes, and so the resulting new schemes will be very similar to the previous scheme which they modify. However, to obtain schemes having increased variety in the arrangement of pieces, the order book lines corresponding to such similar pieces are not scanned. This also helps to reduce computer operating time.

To this end, in an advantageous variant, the order book pieces of predetermined dimensions are grouped by handling unit and classified in decreasing order of cost-representing numerical values in each such unit, the handling units being classified in decreasing order of the mean numerical value of the pieces which each unit includes. To develop the schemes, the book thus classified is scanned line by line. To devise a scheme for a panel by an arrangement of at least one piece taken from the order book to replace an eliminated piece, the order book thus classified is scanned line by line from the first line of the handling unit following the handling unit containing the eliminated piece.

To further increase the chances of obtaining the largest number of optimum schemes right from the start of the scheme preparation, each scanning of the order book for the designing of schemes and the devising of piece arrangements is preceded by a scanning during which only those pieces which have at least one substantially common dimension with the panel still to be used are considered. By "substantially common dimension" there must be understood dimensions differing from one another by 25% or less of the smallest dimension contained in the order book.

Advantageously, at least some of the operations of varying the initial partial schemes are repeated for at least some of the possible ways of cutting out each piece having a given placement. Also, the operations of modifying the initial partial schemes are repeated for at least some of the ways in which the pieces to be cut can be placed so as to be compatible with any flaws present in the sheet, or strip or ribbon. The advantage of these features is that they consider all possible piece combinations with a view to obtaining a collection of all the possible cutting schemes.

It is not always possible, nor necessary, to consider all the ways of placing the pieces for cutting. For example, some materials are anisotropic and the pieces must be placed on the sheets, strip or ribbon with due allowance for this anisotropy. For instance, in the case of drawn glass, allowance must be made in cutting the pieces for the direction in which the glass was drawn.

Preferably, when the selection of cuts for any piece leads to a remainder panel having one dimension smaller than the smallest dimension in the order book, the choice of cuts is necessarily so made that the other dimension of the remainder is the smallest possible. In this event, the sheet area still available for the rest of the scheme is optimized.

Advantageously, the first main, or first-rank, panel to be used is disposed along a front edge of the sheet, or strip or ribbon, whereas the other main, or first-rank, panels are disposed one beside another and beside the first first-rank panel disposed along the front edge of the sheet, strip, or ribbon.

This particular feature, which is of use for sheets, is particularly useful for cutting up a strip or ribbon, for in this case the total area to be used is not clearly defined, since each alternate scheme possibly uses a different total area of the strip. To limit the area for which the various cutting schemes will be devised, the first-rank cuts are made transversely to the sheet, strip or ribbon length and are limited in number, or else they are limited to that part of the sheet, strip or ribbon for which the flaw coordinates are known.

Advantageously, the sheet, strip or ribbon is cut in accordance with that part of the particular cutting scheme retained which comprises at least some of the first-rank panels, whereafter the other part of the particular cutting scheme retained is abandoned and all the scheme-determining operations are repeated for the uncut part of the sheet, strip or ribbon. This logic therefore makes it possible to allow for all of that part of the sheet or strip for which the flaw coordinates are known, and therefore to allow for the effect of flaws beyond the primary panes which are cut by taking into consideration in the preparation of the optimum cutting scheme primary panels which will not be cut. The reason for this is that the flaw coordinates can be introduced into the computer only progressively as the sheet or strip advances. The cutting scheme for the first primary panels are determined on the basis of all the flaw coordinates accessible to the computer at the time when the schemes are devised. Cutting of the end of the sheet or strip is therefore based on he maximum possible amount of data.

From the point of view of profitability of the production line for material in strip, ribbon or sheet form and for cutting such material, it is convenient to maintain a cutting rate which is very close to the material production rate, in order to reduce the number of cutting lines which must be placed in parallel to absorb the supply of the material.

In some cases, to meet this condition, only one of several complete cutting schemes must be obtained very rapidly, even if the schemes are not the best of those which could be obtained. This can be done, for example, by limiting the number of cutting schemes prepared by an arrangement of at least one piece taken from the order book for a remainder panel left by the elimination of a piece from a provisional scheme.

Advantageously, for the same reasons, the cutting schemes are devised during a predetermined period of time, and only one of the cutting schemes obtained during such time is retained.

The time set can be fixed and predetermined, or variable. In the latter event, it can correspond to the time available betwen two cutting operations. For instance, the time available for cutting sheets depends on the number of pieces forming the cutting scheme. This variable time can be very usefully employed for the devising of schemes by the computer.

This computing time restriction is also well adapted to the cutting logic hereinbefore described, since, as already stated, such logic enables most of the best schemes to be devised very rapidly and since the extra time which would be spent in devising further schemes would provide only a very slight improvement in the economic efficiency of cutting. Another result is that the computer is, by the same token, used in an optimum manner.

Advantageously, to prevent the output end of the conveyor delivering cut pieces from being overloaded by a large number of pieces which have widely varying dimensions, which are intended for different destinations, and which result from the conditioned cutting of a ribbon, strip or sequence of sheets, the cutting schemes are devised by combinations of pieces of predetermined dimensions taken from a limited number of sub-units selected from the order book. This makes it unnecessary for the cutting station to be followed by a large sorting station for the cut pieces. Preferably, the selected sub-units of the order book contain pieces which are intended for a limited number of handling units distributed in a number of processing lines which together form a handling group and which are arranged so that when a selected sub-unit has been filled, it is replaced by a new selected sub-unit.

In one advantageous form of this embodiment of the cutting process according to this invention, the first cutting scheme retained is determined by combining pieces of predetermined dimensions from the complete order book, the pieces which form such scheme being intended for a limited number of handling units selected from all the handling units and being at most equal to a predetermined number. Each next scheme which is retained is determined on the basis of pieces intended for the handling units retained from the previous cutting schemes and on the basis of pieces taken from the complete order book and intended for a number of handling units at most equal to the difference between the predetermined number and the total number of handling units retained from the scheme previously used.

Consequently, during the first stage, when the computer draws from the whole of the order book contents to devise the first scheme to be retained, such scheme is formed by a choice of large, medium and small format pieces. These complementary pieces are compatible with the dimensions of the sheets or strip to be cut. In a subsequent stage, if the cutting schemes can include only pieces intended for selected handling units, the choice is limited to a restricted number of pieces, but always with a choice between large, medium and small formats. This ensures the availability of an appropriate assortment of pieces for the subsequent cutting schemes but without this restriction having any appreciable effect on cutting efficiency.

Advantageously, when at least one handling unit has been finished, or filled, the next cutting scheme to be retained is determined by combining pieces of predetermined dimensions intended for at least some of the handling units still being processed and pieces taken from the complete order book and intended for the handling units replacing the filled handling units.

This makes it possible to maintain satisfactory compatibility between the pieces of the assortment in order to maintain high cutting efficiency. In effect, to achieve this result, the handling unit selected will require pieces whose formats are compatible with the pieces of the previously selected handling units.

The invention also relates to an apparatus for performing the process according to the invention. The apparatus is composed of a computer having:

At least one memory store for storing data relating to the sheets or strips, the coordinates of flaws in such sheets or strips, the dimensions and cost value of each piece listed in the order book, and any limitations imposed on the steps of the method;

Logic circuits operatively associated with the store for determining various possible cutting schemes on the basis of data derived from the store;

Adding circuits operatively associated with the logic circuits for determining the total cost value of each cutting scheme determined;

Comparator circuits operatively associated with the adding circuits for comparing the highest values of each successive cutting scheme with the previously obtained highest cutting scheme value; and An output memory store operatively associated with the comparator circuits and logic circuit for storing the highest value scheme thus far obtained and for delivering, at any desired time, the information relating to such scheme.

This invention also relates to a program for programming a computer to determine cutting schemes for material in sheet, strip or ribbon form. The program can be recorded on an appropriate carrier adapted to the particular kind of computer used, for instance, on punched cards, tapes, magnetic tapes, and so on.

The program includes the following logic operations:

Placing, during the design of the schemes, in a panel of the highest rank $m$, a piece which is taken from the order book and whose dimensions are compatible with the coordinates of the flaws present in the sheets, ribbon, or strip, while the panel of rank $(m-1)$ resulting from the placing of a piece of rank $m$, which needs cut of rank $(m-1)$ and $m$, remains unused; selecting for the piece taken from the order book cuts having the rank required to remove such piece from the sheet, strip or ribbon, the ranks of the cuts being at most equal to $n$, so that an initial partial cutting scheme is devised by varying $m$ from 1 towards $n$;

Eliminating the pieces of rank $m$ consecutively, and in the reverse order of their placement, from the partial cutting scheme thus obtained; and devising, for each restored panel resulting from the removal of each piece, a cutting scheme based on an arrangement of at least one piece whose dimensions are taken from the order book, with allowance for the flaw coordinates, the rank of the cuts required to remove such pieces not exceeding $n$, while $m$ is varied in the sense of $n$ towards 1 from the highest rank attained in the design of the initial partial cutting scheme; and Devising, during the elimination of a piece of rank $m$, whenever the elimination affects a piece which needed a cut of rank $(m-1)$, and initial partial cutting scheme and modifying the same for the panel of rank $(m-1)$ which had remained unused, by repeating all the operations before eliminating such piece of rank $m$ and before devising cutting schemes for the resulting restored panel by an arrangement of at least one piece whose dimensions are taken from the order book.

Scheme modifications can be made in the manner hereinbefore defined.

BRIEF DESCRIPTION OF THE DRAWINGS

FIGURES 4a and 4b show two ways of classifying pieces having predetermined dimensions in an order book.

DESCRIPTION OF THE PREFERRED EMBODIMENTS

The description given hereinafter is directed to the use of the process of the invention in cutting sheets, or a continuous strip or ribbon of glass. The process can, of course, be used similarly for other materials in sheet, strip or ribbon form, including sheet metal, paper, plastics, timber, and so on.

Figure 1:
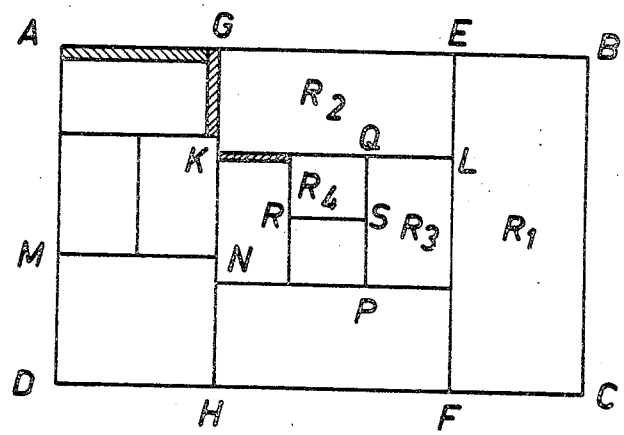
FIGURE 1 is a pictorial view of part of a cutting pattern for a sheet used for explaining the present invention.

A description will first be given, with reference to FIGURE 1, of the concept of the rank of a cut as used in devising the schemes or patterns of the present invention, and the concept of the rank of a piece or panel resulting from such a cut. Rectangle ABCD represents a sheet of glass which is to be cut into a number of pieces whose dimensions are predetermined by the entries in an order book. Part of a cutting scheme has already been prepared on the rectangle by the placement of a number of lines defining smaller rectangles along which lines the sheet will be cut once the complete pattern has been established. The rectangles $R_1$, $R_2$, $R_3$ and $R_4$ define portions of the sheet parts for which no cutting pattern has as yet been devised, and the other rectangles, except for the cross-hatched rectangles, correspond to pieces which will meet the requirements of the order book. The hatched rectangles represent unusable items which in the case of glass will be treated as cullet, or scrap.

Rectangle $R_1$ can be removed from the glass sheet by a single cut along line EF which extends from one edge of the sheet to the other. The line EF represents a first-rank, first-order, or primary cut, and the rectangle $R_1$ obtained by such cut is a primary, or first-rank, or first-order piece or panel. A first-rank cut is necessary for removing the rectangle $R_1$ from the original sheet. The line GH represents another cut of the first rank, or rank 1, enabling two other primary panels AGHD and GEFH to be removed.

To remove the rectangle $R_2$ from the glass sheet, a further cut must be made along line KL between two first-rank cuts. The cut along KL is a second-rank second-order, or secondary cut and when such a cut is required to remove a piece, such as piece $R_2$, that piece is referred to as a second-rank, second-order or secondary piece or panel. A second-rank cut can also extend between a first-rank cut and an edge of the sheet, as is represented by the line MN. Similarly, to remove the rectangle $R_3$ from the sheet, another second-rank cut through point P must be made, followed by a third-rank cut PQ. To then remove piece $R_4$ it is necessary to make another third-rank cut through point R, and then a fourth-rank cut RS must be made.

Thus, a cut of any particular rank always extends between two cuts of an immediately preceding rank, or between an edge of the sheet and one cut of such immediately preceding rank. Also, even-rank cuts (i.e., ranks 2, 4, 6, etc.) are parallel to one another and perpendicular to odd-rank cuts (i.e., ranks 1, 3, 5, etc.). Finally, cuts are made in order of increasing rank number.

Figure 2A:
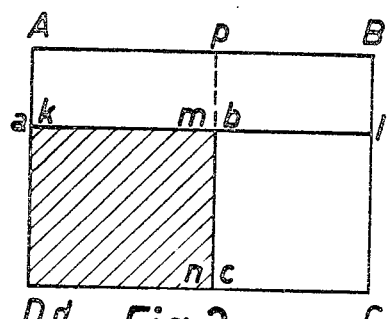
FIGURES 2a and 2b are pictorial representations of two possible ways of cutting out a given piece.

In the development of various cutting schemes, or patterns, two cuts of consecutive ranks usually have to be selected for each piece from amongst the various cutting possibilities for the piece concerned. Basically, there are four possible ways of cutting a piece placed in a given corner of a rectangular sheet to be used and these ways are shown in FIGURES 2a and 2b.

According to the first way, a piece abcd which is to be cut out is located in a corner of the sheet, for instance, the corner D, with its long side cd extending along the long side CD of the sheet. The piece can then be removed from the sheet by a cut kl followed by a cut mn.

According to a second way, the piece is positioned similarly but is removed by a cut pn followed by a cut km.

Figure 2B:
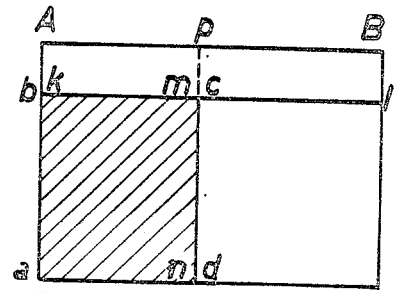

The two other ways are obtained similarly by the same cuts, except that, as is shown in FIGURE 2b, the piece abcd is placed in the same corner D of the sheet but with its narrow side ad extending along the long edge or side CD of the sheet.

If the long side cd of the piece is longer than the narrow side DA of the sheet to be cut, the number of possible ways of cutting out the piece is reduced to two. The choice between the ways of cutting must be made not only with regard to cutting a first piece from the sheet of glass, as is shown in FIGURES 2a and 2b, but also for cutting a piece of any rank from an area to be utilized. For instance, this selection must be made with respect of any piece to be removed from the rectangle $R_4$ in FIGURE 1. The number of possible ways of cutting out a piece becomes greater than four when the piece to be cut is not required to be placed at a corner.

Although the primary cuts could conceivably be made in either of the two possible directions, i.e., either perpendicular to the long side AB of the sheet or perpendicular to the narrow side BC thereof, the convention will be adopted hereinafter that the primary cuts are always made perpendicular to the long edge of the sheet. Consequently, all the odd-rank cuts will be perpendicular to the long edge or side of the sheet and all the even-rank cuts will be perpendicular to the narrow side of the sheet.

As a result of adopting this convention, for instance, in the case of FIGURE 2a the piece abcd is, according to one cutting procedure, removed from the sheet ABCD by a primary cut pn and by a secondary cut km. According to the alternate cutting procedure, kl is considered as a secondary cut and mn represents a tertiary or third-rank cut. The primary cut which must in theory precede these two cuts is assumed to coincide with the sheet edge BC.

Another choice which must be made when devising the various cutting schemes is between the various ways of orienting, upon the area to be utilized, the format of the piece to be cut out. This can take into account any flaws which may be present in such area.

Figure 3:
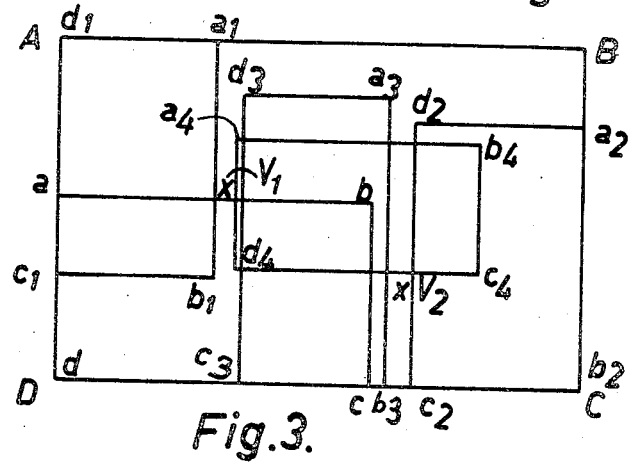
FIGURE 3 is a pictorial representation of possible ways of placing a piece in the case of a sheet containing flaws for further explaining the present invention.

Referring now to FIGURE 3, it will be assumed that the area to be utilized is again the sheet ABCD. The same has, for example, two flaws, $V_1$ and $V_2$, which are assumed to be point-like and which can not be present in the resulting pieces because this would cause the pieces to be rejected. A first possible placing of a piece to be cut is represented by the rectangle abcd, whose dimensions correspond to a piece listed in the order book. This piece does not contain either of the flaws $V_1$ and $V_2$. Another possible way of positioning a piece whose dimensions are not necessarily identical to those of the rectangle abcd, is shown by the rectangle $a_1b_1c_1d_1$. Other possibilities are represented by the rectangles $a_2b_2c_2d_2$ and $a_3b_3c_3d_3$, and a further possible way of placing the piece is represented by the recangle $a_4b_4c_4d_4$. In this last possible position, the piece is placed in the middle of the sheet right next to the two flaws $V_1$ and $V_2$.

As these few necesarily limited examples show, there are many possible ways of locating a piece in a flawed sheet. In practice, however, the possibilities are limited, for instance, by imposing the restriction that the piece be placed in one of the corners of the sheet, or between the flaws but in contact with one sheet edge, as exemplified by rectangle $a_3b_3c_3d_3$ in FIGURE 3.

In the case where a first piece must be positioned on a continuous strip or ribbon, a possible restriction that can be imposed is that the pieces must be placed in the corners of the strip or ribbon or, if it is required to place the pieces between the flaws, the restriction may be imposed that one of the sides of the first piece must be disposed along the front, or leading, edge of the strip or ribbon.

As FIGURES 2 and 3 show, the choice of a manner of cutting and of a manner of positioning have a considerable effect on the subsequent cutting possibilities available, and so all of the possible combinations for each piece between the ways of cutting and the possible ways of placing it must be considered in the development of the patterns for dividing a sheet or strip. The only feasible way of doing this in practice is by using a computer.

To facilitate understanding, consideration will be given hereinafter only to a single manner of cutting and to a single manner of placing for each piece making up a cutting pattern. These modes may differ from one piece to the next in the same scheme, or pattern.

A first, non-limiting, example to be given below of the development of an optimum cutting scheme relates to the cutting of a sheet having predetermined dimensions.

Actually, and as has already been stated herein, the procedure for devising schemes as will be described hereinafter forms a logic base according to which a computer can be programmed to derive the various possible schemes.

During the making of the finished product and at any given time there exists an order book consisting of a particular number of items to be made. A numerical value representing the first cost, or cost price, is allotted, in a manner to be described hereinafter, to each item in the order book. Associated with this order book are a number of sheets, either of the same dimensions or of different dimensions, from which the pieces representing the order book contents are to be produced.

Consideration will be given hereinafter to optimization based on the criterion of cost price. Of course, the logic of devising the schemes and the selection of the best scheme can be based on other criteria without departure from the spirit or scope of the invention.

Other possible optimization criteria are the area used or the minimum number of cutting lines, as hereinbefore mentioned.

The order book pieces are then classified in decreasing order of their cost-representing numerical values, as shown in an example in FIGURE 4a, where column A(I) indicates the number of pieces of each size to be cut, the length and width dimensions of the pieces being given in the columns L and l, respectively. The column C.V. indicates the numerical cost value allotted to each piece. The order book thus arranged is examined line by line for developing the possible cutting schemes.

An alternative way of classifying the order book items is illustrated in FIGURE 4b. The items are grouped into handling units—in this particular case, by containers—and the container groups are arranged in decreasing order of the mean, or average, of the cost-representing numerical values of the pieces intended for each container. The column headings have the same meaning as for FIGURE 4a, and the colunm $n$ indicates the identification number assigned to the particular container. As FIGURE 4b shows, the pieces intended for any single container have very similar dimensions.

As the cutting schemes are varied during the search for the best scheme, it can be seen that, if the item of the first line of container No. 1 is replaced by the item of the second line of such container, there is a very great probability that the new scheme will be very similar to the immediately preceding scheme, something which is not particularly useful. Conveniently, therefore, scanning of the order book can proceed immediately to the first line of container No. 2 without scanning all the lines corresponding to the first container.

The pieces for container No. 2, although of larger dimensions than the pieces for container No. 1, may possibly be suitable for devising the new scheme, since the pieces of container No. 2 are of lower quality than those of container No. 1 and can possess some flaws which are not allowable for the pieces of container No. 1. This is why the numerical values allotted to the pieces of container No. 2 are close to the numerical values allotted to the pieces of container No. 1 despite the larger dimensions of the former pieces in proportion to their values, as will be described hereinafter.

In the development of a cutting scheme for a sheet, any flaws in the sheet are first detected. For example, in the case of the sheet ABCD shown in FIGURE 5a, the flaws $V_1$, $V_2$ and $V_3$ will first be located.

These flaws can be detected, and their coordinates relative to two sheet edges at right angles to one another can be determined, either by simple visual inspection or by automatic sensing devices, such as photoelectric cells. Each flaw has allotted to it, in addition to position coordinates, a value representing its importance as regards its effect on finished product quality. In this system, the flaws can be classified in a number of categories. For instance, in the example shown in FIGURE 5a, the flaws $V_1$ and $V_2$ are considered unacceptable for the quality of the particular pieces concerned, whereas flaw $V_3$ is considered acceptable. In other words, certain types, or degrees, of flaws are allowable in the end products.

After the flaws have been located and their nature determined, the classified order book is scanned line by line and a first piece is located on the sheet to be cut. In actual fact, the operation is not physically carried out at this time but it is simply described in this manner to facilitate the explanation of the logical procedure for devising the schemes. Similar considerations apply throughout the remainder of the present description. This first piece has the highest cost-representing value and has dimensions which are compatible with the flaws.

Figure 5A:
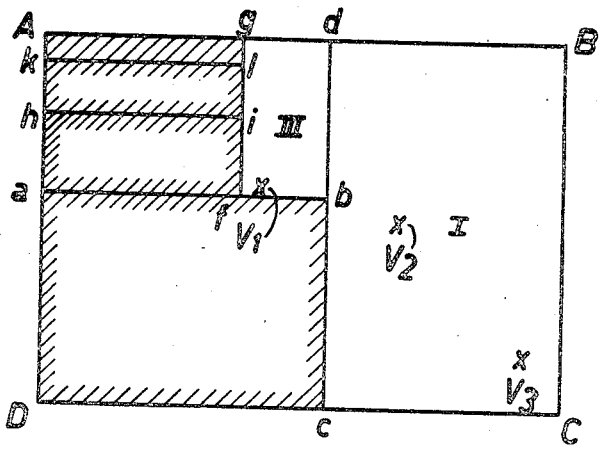
FIGURES 5a, 5b and 5c are pictorial views showing three steps in the development of a cutting pattern for a sheet according to the present invention.

In the case shown in FIGURE 5a, this piece is represented by a rectangle abcD. A first-rank cut $cd$ and a second-rank cut $ab$ are chosen to remove this piece from the sheet. The piece is therefore classified as a second-rank piece. The ways in which the piece is thus placed and cut give rise to two remaining panels, namely a second-rank panel Adba and a first-rank panel dBCc. For the time being, the first-rank panel is not utilized. The order book scanning then continues, and the second-rank panel Adba is marked off in the same way with a piece whose cost-representing value is a high as possible and whose dimensions are compatible with the flaws. The latter piece is represented by $afih$ and would be removed by a third-rank cut $gf$ and a fourth-rank cut $hi$. The removal of this piece would leave a third-rank panel $fbdg$, which is not exploited for the time being, and a fourth-rank panel $higA$. A further piece $hilk$ having the highest possible value is marked on the last-mentioned panel and would be removed therefrom by an extra fourth-rank cut $kl$.

This piece has one common dimension with the fourth-rank panel $higA$ on which it was placed. This piece was taken from the order book as a result of the order book having been scanned first only for items sharing one substantially common dimension with the panel to be used. Of course, the pieces having the highest possible value are selected from the order book items having this feature. This scanning was also performed before the piece $afih$ was selected, but failed to disclose any pieces having a common dimension with the panel $abdA$, and the order book was scanned again line by line, irrespective of the order book classification chosen.

At this stage the third-rank panel $fbdg$ has still not been exploited, while the fourth-rank panel $klgA$ will be the next to be exploited. The dimensions thereof turn out to be smaller than the dimensions of the smallest item in the order book, and so panel $klgA$ can not be exploited. The dimensions thereof turn out to be smaller than the dimensions of the smallest item in the order book, and so panel $klgA$ can not be exploited. This panel will be treated as cullet.

An initial first partial scheme or pattern has therefore been devised. The end of the development of this scheme results from the impossibility of using the panel $klgA$. However, the end of development may be due to some other reason, e.g., a limit set on the last permissible rank of a cut. Let us assume, for instance, that the highest permissible cut rank is 5 in preparing a scheme and that panel $klgA$ still has dimensions such that an order book item can be cut from it. If such piece has the same width as the panel width $kA$, such piece could be removed by a fiifth-rank cut (not illustrated) and the piece could therefore be located on the panel. The initial partial scheme then ends when a sixth-rank panel would not appear as the result of removing the particular piece concerned. On the other hand, if the piece has a width less than the width $kA$, it requires a fifth-rank and a sixth-rank cut to remove it, something which is not allowable. Such piece could not, therefore, be removed from the panel $klgA$ and the same goes as cullet. This state of affairs also terminates the derivation of the initial partial scheme.

The initial partial scheme thus obtained is stored, e.g., in the computer memory, and then modified. First the cullet piece $klgA$, which can not be replaced by any piece from the order book, is eliminated. The piece $hilk$ is then eliminated and the panel $higA$ is considered to be a fresh panel to be exploited. The same is exploited as follows:

The scanning of the order book starts at the line corresponding to the piece $hilk$ and then reviews the succeeding lines in those cases where the order book items are arranged by decreasing order of their values, or, in those cases where the order book is arranged in decreasing order of the mean values of the pieces in each container, the line corresponding to the piece $hilk$ is first considered, and then successive entries are reviewed, starting from the first entry of the container following that which contains the piece $hilk$. Scanning proceeds until the first piece is found whose dimensions are compatible with the flaws present in the sheet. Such piece has either a lower numerical value than the eliminated piece $hilk$ or dimensions which differ considerably from the dimensions of such piece.

Figure 5B:
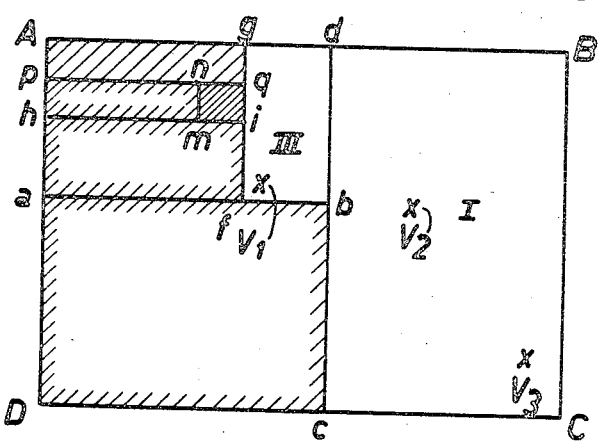

The latter piece is represented by $hmnp$ in FIGURE 5b and implies the selection of the fourth-rank and fifth-rank cuts $pq$ and $mn$.

The resulting fourth-rank panel $pqgA$ is not exploited for the time being, and the exploitation of the fifth-rank panel $mign$ commences. Such panel, since its dimensions are too small, goes as cullet. Thus, a new initial partial scheme has been devised. This partial scheme is compared with the partial scheme shown in FIGURE 5a and the better scheme of the two, with respect to the particular criterion being relied on, is stored in the computer memory.

This newest partial scheme is to be modified. First, the fifth-rank panel *miqn* is deleted from the scheme. Since it can not be replaced by any other piece, an attempt is then made to also delete the fifth-rank piece *hmnp*. Such piece requires a fourth-rank cut which would produce the panel *pqg*A thus far unexploited. Therefore, the piece *hmnp* will only be eliminated once the possibilities of the panel *pqg*A have been exploited. For the exploitation of the latter panel, the best cutting scheme for the panel *miqn* is maintained, which panel is presently cullet. Assuming that the fourth-rank panel *pqg*A is also to go as cullet, this newest partial scheme is compared with the better of the two previous schemes, and the best resulting scheme is stored while the previously better or best scheme is erased from the computer memory.

This third partial scheme, even if not retained, is in turn modified. First, the pieces *pqg*A and *miqn* are eliminated. Since they were going as cullet because they were too small, they can not be replaced by other pieces. The piece *hmnp*, requiring a fourth-rank and a fifth-rank cut, is then eliminated, the possibilities of the fourth-rank panel *pqg*A having been completely explored.

Replacement of the piece *hmnp* by a piece of lower numerical value, as a result of order book scanning starting from the piece *hmnp*, leads to the devising of a fresh partial scheme and to modification thereof for the fourth-rank panel *hig*A, in just the same way as the elimination of the piece *hilk* from the pattern of FIGURE 5a led to the various schemes described with reference to FIGURE 5b. The operations of devising and modifying schemes succeed one another with relation to the fourth-rank panel *hiqp* until the partial scheme for the panel *hig*A contains only the smallest piece in the order book. Immediately upon the development of each scheme, it is always compared with the best scheme retained previously, and the best resulting scheme is stored.

The elimination of this smallest piece leaves once again the panel *hig*A for which a smaller piece can not be placed. Endeavors are therefore made to remove the piece *afih*. Such removal will not be carried out, however, since the latter piece requires a third-rank cut which left the possibilities of the third-rank panel *fbdg* unexplored. Therefore, the latter panel is next explored in accordance with the same principles by consecutive constructions and modifications of partial schemes, the first partial scheme for this panel being constituted by pieces having the highest possible cost-representing numerical values. During exploration of this panel, the various schemes are compared with one another while taking into consideration the best scheme retained for the panel *hig*A.

Replacement of the piece *afih* by a smaller piece initiates the construction of a fresh partial scheme and its consecutive modifications by a procedure similar to that which has been described in the foregoing.

Consequently, this new piece, whose value is smaller than the value of the piece *afih* creates new third-rank and fourth-rank panels of which the third-rank panel will not be explored until all the possible combinations have been devised for the fourth-rank panel, this possibly being preceded by a complete exploration of derived fifth-rank panels. The new piece will be eliminated only after the third-rank panel has been exploited, the operations being performed step by step.

Similarly, the second-rank piece D*cba* will be eliminated only after the first-rank panel *c*CB*d* has been tested by all the possible combinations which have in turn been derived by line-by-line scanning of the order book.

Figure 5C:
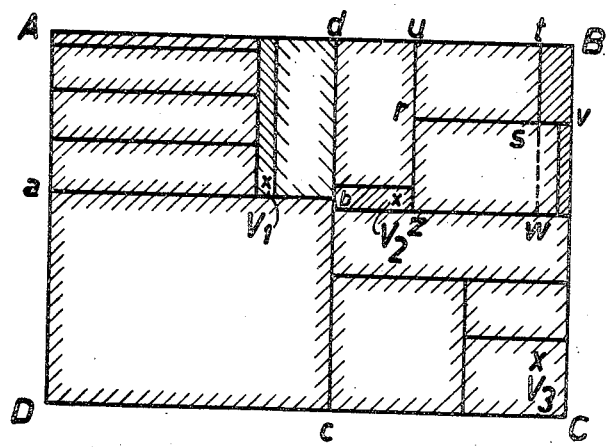

FIGURE 5c shows a cutting scheme which covers the whole area of the sheet ABCD and which was obtained before it was possible for the piece D*cba* to be replaced by a smaller piece. The pattern covering the primary, or first-rank, panel D*cd*A represents the best pattern found thus far for that panel.

The pattern which covers the primary, or first-rank, panel *c*CB*d*, represents one of the schemes obtained in the search for the best scheme. This intermediate scheme has a few special features.

First, the flaw $V_3$ is considered to be allowable for the piece placed at the corner C of the sheet to be cut up.

An allowance has been made in this scheme for a restriction on the possible cutting procedures. The fifth-rank piece *rstu*, for the particular placement chosen, can be cut by either a fourth-rank cut *rv* and a fifth-rank cut *st* or by a third-rank cut *wt* and a fourth-rank cut *rs*. In both cases the remaining portion has the same width *t*B, but the lengths differ—i.e., it equals *ts* in the first case and *tw* in the second case. The width *t*B is assumed to be less than the smallest dimension which can be found for an item in the order book.

Consequently, no further piece from the order book can be placed in this remaining panel so that the cutting procedure to be retained is preferably the one which minimizes the length of such remaining panel, i.e., by cutting along *rv* and then *st*, in order to minimize waste of material and to enable a piece having a length greater than *rs* to be placed, as is the case for the fifth-rank piece disposed directly below the piece *rstu*.

The logic just described permits the total number of possible cutting schemes to be determined without the risk of any particular one being forgotten and also, as has already been stated, helps to obtain most of the best schemes right at the beginning of operations.

This property of the cutting logic can be exploited in some cases when it is desired to not unduly lengthen the time taken to devise the schemes in order not to upset the operation of a continuous production line. If an electronic computer is used, the time for devising these schemes can be limited, for instance, to 60 seconds. We have found that schemes devised after this time provide an improvement of only a few fractions of 1% in the resulting economic gains over what is obtained with the schemes prepared during the first 60 seconds, if care is also taken to limit the number of times that one piece of an initial partial scheme can be replaced.

Since the best of a number of schemes for each first-rank panel can be stored very rapidly, the logic according to the invention makes it possible to cut up the single first-rank panel to the left of the line *cd* into a number of pieces with a relatively good efficiency without the need to wait for the scheme representing the best pattern for the complete panel. This makes it possible to take up any differences occurring in production-line speed between strip formation and the finished product packaging section.

The exploitation of the first-rank panel, which must be cut up rapidly, makes allowance for the possibilities of exploiting the complete sheet. For similar reasons, the logic is advantageous for cutting a strip or ribbon into pieces, as will become apparent hereinafter.

For comparing the various schemes with one another in order to determine which is the optimum cutting scheme, the cost-representing numerical values allotted to each of the pieces are totalled for each pattern. The scheme for which the total is a maximum is retained, and the sheet is cut up in accordance with such scheme. In the case of sheets, the total area used for each scheme need not be considered, since it is the same for all schemes and is equal to the area of the sheet ABCD for which the schemes are devised.

The entries corresponding to the piece making up the cutting pattern actually employed are removed from the order book. To cut the next sheet, the schemes are devised from the order book which has been revised by the deletion of the pieces obtained from the first sheet. The order book is periodically revised with new entries on the basis of fresh orders from customers. There is therefore no risk of a substantial reduction in the assortment of piece sizes to be cut which might reduce cutting efficiencies as the contents of the order book become exhausted.

Another example of how the process according to this invention can be used concerns the cutting of a continuously manufactured ribbon or strip of glass. Basically, the same logic as has been described in the foregoing with reference to the cutting of sheets applies. However, allowance must be made for the fact that the area to be exploited does not have absolutely clearly determined dimensions, since the length of the strip on which the first cutting scheme is to be prepared is indeterminate. This ambiguity can be eliminated by imposing the restriction that any cutting scheme devised can contain only a limited and predetermined number of first-rank cuts, or that no one scheme can extend beyond a particular length of the strip.

Figure 6A:
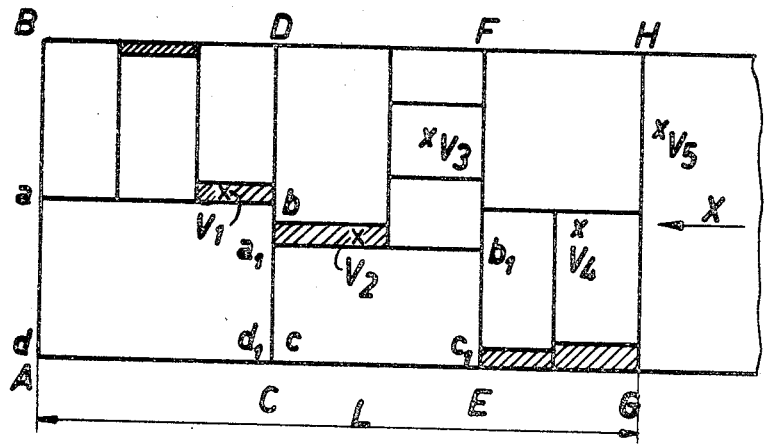
FIGURES 6a and 6b are pictorial views showing two steps in the development of a cutting pattern for a strip or ribbon according to the present invention.

FIGURE 6a shows one of the cutting schemes obtained by the construction and modification of successive schemes and constituted by a number of primary or first-rank panels.

This scheme was limited to three first-rank panels. To devise it, the strip was first examined for flaws. Flaw detection can be performed in a manner similar to that described with reference to the cutting of sheets, at an inspection station past which the ribbon or strip moves. The direction of strip movement is represented by an arrow X in FIGURE 6a. The strip inspection station is disposed upstream of the strip-cutting station and far enough away therefrom for a sufficiently large area of the strip to be available for the cutting of the pattern, this distance being the factor which actually determines the number of first-rank cutting lines which can be considered in the preparation of a given scheme. This is true because, before the first cutting scheme can be devised, all the flaws in that part of the strip for which the cutting scheme is to be devised must have been located, and the coordinates of such flaws must have been fed into the computer. In FIGURE 6a, flaws are shown at $V_1$, $V_2$, $V_3$, $V_4$ and $V_5$. The flaws $V_3$ and $V_4$ are assumed to be acceptable in the finished pieces.

After the flaws have been located, a first piece $abcd$ which has the highest possible numerical value and whose dimensions are compatible with the flaws is located on the strip or ribbon, exactly as for the material in sheet form.

Preferably, this first piece has one of its sides disposed along the strip front edge AB. Consequently, as far as positioning is concerned, this first piece can be positioned either in one of corners A or B or along the edge AB so as to be clear of the flaws, in a manner similar to that employed for locating the piece $a_3b_3c_3d_3$ of FIGURE 3. To remove the first piece $abcd$, a first-rank cut CD must of course be made across this strip, followed by a second-rank cut $ab$. These cuts are not, of course, actually made until the entire scheme has been finalized. The panel remaining to the left of the line CD is then marked off in an optimum manner with combinations of pieces determined by step-by-step constructions and modifications of possible schemes. When a modification is to affect the piece $abcd$ itself, then, before such piece is eliminated from the scheme or reoriented therein, a piece $a_1b_1c_1d_1$ which has the highest possible value and whose dimensions are compatible with the flaws is placed to the right of the line CD. Placement possibilities for this piece are similar to the placement possibilities for the piece $abcd$ but with the line CD being considered as being the front edge. The first-rank cut for this piece is along a line EF and is transverse to the direction of strip advance. The remaining second-rank panel $DFb_1a_1$ between the two first-rank cuts CD and EF is then explored too. The same procedure is followed for the third first-rank panel FHGE.

Figure 6B:
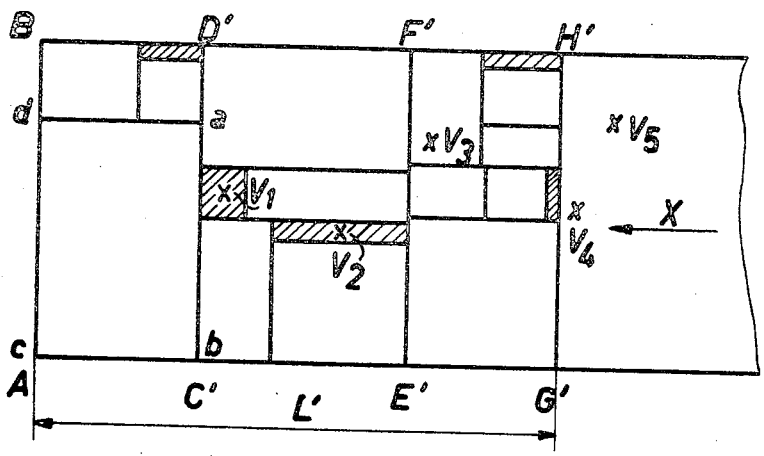

The number of primary cuts must be limited if the scheme-devising logic is to be able, at a given time, to replace or reorient the pieces which determine the locations of the primary cuts, something which would otherwise be impossible if the procedure logic simply dictated the endless addition of primary panels one after another. Since a limit has been set, at some moment, the piece $abcd$ is required to be removed and replaced by another piece, or to be simply reoriented. Thus, this can consist, for instance, of the choice of some other way of cutting the piece, for instance as is shown in FIGURE 6b. Starting with the piece thus placed, the sequence of operations is repeated until three further primary cuts C'D', E'F' and G'H' have been determined. Of course, modifying the first-rank panel ACCD to create another first-rank panel ABD'C' leads to modification of the other two first-rank panels DFEC and FHGE to create the panels D'F'E'C' and F'H'G'E' shown in FIGURE 6b.

In the case shown in FIGURE 6a, a strip length L was used to device one of the schemes, whereas the scheme shown in FIGURE 6b uses a length L' which is smaller than L.

To determine which scheme to retain for the actual cutting, the cost-representing numerical values of the pieces concerned in the scheme are totalled for each scheme and the total for each scheme is related to the particular strip area used which, in the case shown in FIGURE 6a, is the area of the strip disposed between the front edge AB and the third first-rank cut GH and, in the case of FIGURE 6b, is the area of the strip disposed between the same front edge AB and the third first-rank cut G'H'. The resulting comparison of each numerical value total and its associated strip area serves to determine which scheme represents the most efficient economic utilization of the strip material.

Once the best scheme has been determined and retained, the glass strip is actually cut in accordance with that part of such scheme which corresponds to the first panel of first rank, ABDC or ABD'C', the remainder of the scheme being abandoned. In the example shown in FIGURE 6b, the strip is cut in accordance with that part of the scheme which is to the left of the cutting line C'D', on the assumption that the scheme shown is the optimum one, and that part of the scheme which is to the right of the line C'D' is abandoned.

Thereafter, the latter line forms the new front edge of the strip and new schemes are devised starting from that edge. With this procedure, maximum consideration can be given at all times to all data relating to the pieces required and to the flaws in the strip. One noteworthy feature is that the choice of cutting scheme for the first panel ABD'C' takes into consideration the flaws $V_1$, $V_2$, $V_3$ which are not present on such panel.

The example has been described with the number of first-rank cuts limited to three but the process is of course of use with the number of first-rank cuts limited to some other value, the choice depending upon conditions of strip exploitation and inter alia upon the time available between flaw detection and cutting implementation.

Thus, the procedure for a complete determination of the possible patterns that can be formed on a sheet or on part of a strip or ribbon can be summarized as follows:

(1) A first piece, which preferably has the highest value of pieces listed in the order book and hence which is usually the largest piece of the highest quality group, is laid out along one edge of the sheet, preferably at a corner, so that its dimension parallel to the length of the sheet or strip determines the position of a first-rank cut, and hence the length of the resulting first-rank panel in which this piece lies;

(2) The portion of the first-rank panel not taken up by the first piece constitutes a second-rank panel whose possibilities are to be explored;

(3) When any single piece is located on this second-rank panel, such piece can be of the second-, third-, or fourth-rank type and the remaining panel portion or portions will constitute a smaller second-rank panel, a third-rank panel, or one third-rank panel and one fourth-rank panel, respectively;

(4) The possible patterns for the remaining panel of the same rank as, or of a higher-number rank than, such single piece is explored by locating a further single piece thereon, thereby creating at least one smaller remaining panel either of the same rank as, or of a higher-number rank than, such further piece;

(5) This process continues until the remaining panel is smaller than the smallest piece listed in the order book and the pattern thus far created is stored in the computer;

(6) Then the last piece marked off is eliminated from the pattern, the other possibilities of the panel thus restored are explored, and each resulting scheme is compared with the one previously stored. However, before any one piece is eliminated, exploration is carried out on any panel created by the marking off of that piece and having a lower-number rank than that piece. Thus, in the case of step (3), if the single piece located on the second-rank panel is of the fourth-rank type, the resulting third-rank panel is explored before that single piece is eliminated from the scheme;

(7) Then the piece or pieces marked off on this restored panel are eliminated from the pattern together with the next preceding piece to recreate a larger panel whose other possibilities are explored, the resulting schemes being compared to determine the optimum one;

(8) This backtracking procedure continues until all of the possibilities of the second-rank panel created by the marking off the first piece have been explored, and the best scheme is retained in the computer memory;

(9) Then, before eliminating or reorienting that first piece, all of the possibilities of the adjacent first-rank panel are explored in a similar manner;

(10) Finally, the first piece is replaced or reoriented to create a new first-rank panel and the above procedure is followed once again until all possibilities for the entire sheet or strip portion have been considered.

Of course, as noted above, various ones of these steps can be eliminated or restricted in order to reduce the calculating time and if such modifications are judiciously selected the result will be only slightly less than optimum.

The allotment of a cost-representing numerical value to each of the order book pieces to be cut is based on experimental data. To deal completely with any particular order book which includes large, medium and small format pieces, the area of glass required either in sheet or strip or ribbon form to implement the order book can be either estimated before the cutting or determined after the cutting of pieces for filling the complete order book. A geometric cutting efficiency, which is the ratio between the total area of the cut pieces and the area of the sheet or strip from which they were cut, can therefore be determined. On the assumption that the cost price of an uncut square meter of glass has a value of unity, the cost price of a square meter of cut glass can be determined from the geometric efficiency.

However; this is not enough to determine the cost price of each cut piece because such determination also requires a knowledge of the effect of each of the formats on the cost price of a square meter of cut glass. To this end, a new order book is prepared by adding, in the order book for which the geometric efficiency has already been determined, a unit area first, for instance, to the large format pieces. A new geometric cutting efficiency can then be determined for this modified order book. The difference between the latter efficiency and the efficiency of the unmodified order book is a value representing the influence per unit of area of the large formats of the order book on cost price and therefore reflects the marginal cost price of the large formats. The resulting marginal cost price of the large formats is obtained by subtracting from the cost price of the cut glass the value obtained by multiplying the said difference by the ratio between the area represented by all the pieces of the order book and the square of the geometric cutting efficiency of the unmodified order book.

The same determination can be made for medium and small formats. The various kinds of formats can be divided more finely than that just set forth. An example of the results of such a determination is represented in FIGURES 7 and 8.

Figure 7:
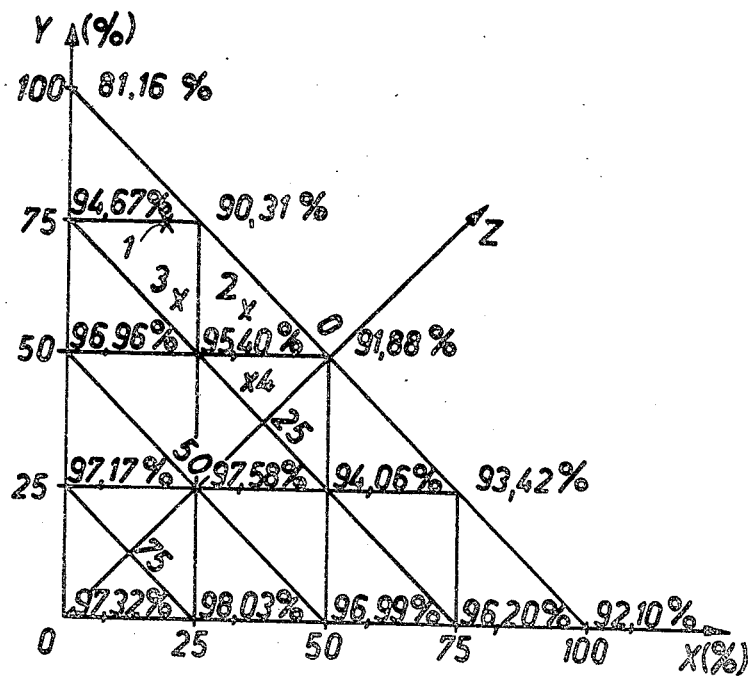
FIGURE 7 is a diagram used in explaining the present invention and illustrating the relation between cutting efficiencies and order book make-up.

FIGURE 7 shows in diagrammatic form the geometric cutting efficiencies for various order-book arrangements, selected percentage efficiencies being shown on the diagram. The abscissa axis OX indicates the percentage of medium format pieces in the order book, the ordinate axis OY represents the percentage of large format pieces, and the axis OZ represents the percentage of small format pieces in the order book. In the preparation of this diagram, pieces having an area of 3.5 m.$^2$ or more were considered to be of large format, pieces having an area less than 1 m.$^2$ were considered to be of small format, and pieces having an area of from 1 to 3.5 m.$^2$ were considered to be of medium format. Other percentage cutting efficiencies could be derived by interpolation between the various points for which percentages are shown on the diagram. These cutting efficiency percentages are not to be confused with the format proportion percentages shown along the coordinate axes of the diagram.

To determine the proportion of each format for a given order book, which is represented by a given point on the diagram, it is only necessary to construct a line from the point perpendicular to each coordinate axis, and the intersection of each line with its associated axis represents the percentage of pieces of that format in the order book. Thus, point 1 in FIGURE 7 represents an order book having 20% medium format pieces, 75% large format pieces, and 5% small format pieces.

Figure 8:
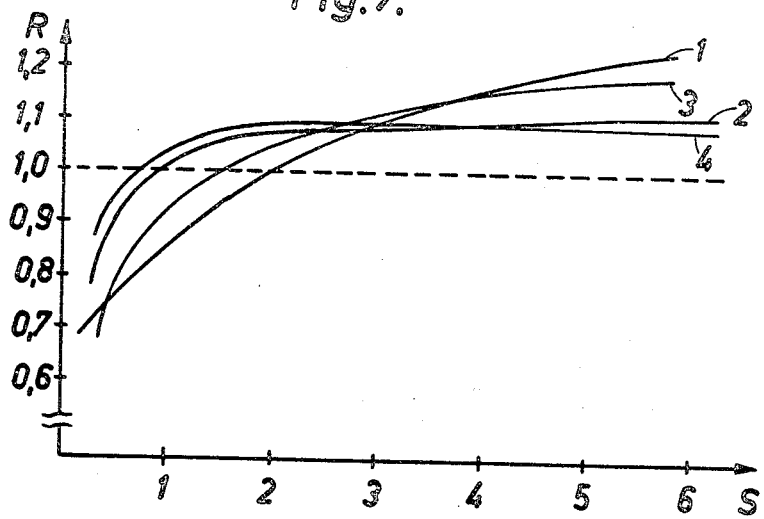
FIGURE 8 shows a series of curves indicating how the ratio R between the marginal first cost and the area S of the piece varies in dependence upon such area S for different order book make-ups.

Curves 1, 2, 3 and 4 in FIGURE 8 show the variation of the ratio R between the marginal cost price and the area of a piece as a function of the area S of pieces having different formats, prepared from the efficiencies shown in FIGURE 7, and in the manner hereinbefore described, for four order books whose contents are represented by points 1, 2, 3 and 4, respectively, in FIGURE 7. These curves show that the marginal cost prices of pieces of identical format depend upon the distribution of the total order-book contents. For any given order book, the numerical value to be allotted to each piece of the order book is equal to the marginal cost price of such piece.

By preparing a family of curves, like the curves shown in FIGURE 8, for a large number of possible order book arrangements, the values allotted to the order book pieces can be modified periodically in dependence upon the evolution of the order book composition with time, so that the establishment of the economic efficiency of the cutting operations comes very close to reality. For instance, in the case in which an order book covering a period of three or four months is available, order book composition is checked every fortnight and, if order book composition has altered appreciably, the values allotted to the pieces are modified accordingly.

The curves shown in FIGURE 8 were prepared for a particular glass quality—in the present case, very good quality window glass suitable for making mirrors. Similar curves can be prepared for other glass qualities, e.g., plate glass, ordinary window glass, and so on. The corresponding curves will differ from the curves of FIGURE 8 since the quality to be achieved alters the geometric efficiency of cutting as well as the marginal cost price of the various formats. If, for instance, quality is higher, cutting requires a bigger area of glass than was required for the first-described quality, and the geometric efficiency decreases. Also, large formats affect the marginal cost prices more than do the same formats of the first-described quality.

Figure 9:
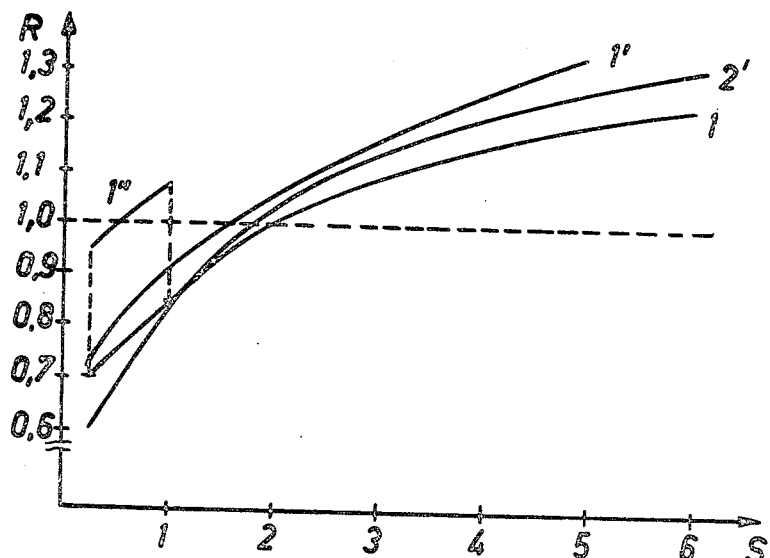
FIGURE 9 shows curves similar to those of FIGURE 8 as affected by various restrictions.

This is so because, in a production process in which flaw density and the distribution of the flaws among different kinds are assumed to remain constant, fewer flaws are allowable in the higher-quality pieces than in the lower-quality pieces. In FIGURE 9, curve 1 is identical to the curve 1 of FIGURE 8. Curve 1' corresponds to an order book having the same makeup, but intended for a higher-quality glass, for instance, plate glass.

Variations in the density of the flaws present in the sheets, ribbon or strip have a similar effect, modifying the geometric efficiency of cutting and affecting the marginal cost prices, since a reduction in such density makes it easier to cut an order book which has been modified by the addition of a unit surface area to the large formats thereof.

A flaw-free glass sheet or strip is assumed to be represented by the curve 1 in FIGURE 9. Curve 2' of FIGURE 9 was prepared for the same quality of glass with the same order book composition as for curve 1 but with a 0.1 m.$^2$ flaw density, each particular flaw concerned being point-like, i.e., having an area of 1 cm.$^2$ or less. Once the marginal cost prices of the pieces for various order book compositions and various glass qualities are available, some form of priority can readily be introduced for the pieces. For example, the marginal cost price of high priority pieces can be increased arbitrarily.

Referring to FIGURE 9, it will be assumed that, at a given moment, small pieces whose areas are less than 1 m.$^2$, which must be cut very quickly, are introduced into the general order book. It is assumed that the curve to be considered is the curve 1. If the marginal cost prices established by curve 1 were allotted to the high priority pieces, the same would not be given first priority during the development of the cutting schemes because the logic on which these schemes are based first prepares the scheme with the highest possible values, then merely partly modifies the scheme subsequently during a predetermined period of time. For the pieces to be cut very rapidly, that part of the curve which corresponds to formats smaller than 1 m.$^2$ is shifted upwardly, for instance, up to the cost price level for medium formats, as represented by a line 1". Except for the small urgently needed pieces, whose values are set by the curve 1", values taken from the curve 1 are alloted to all the pieces of all the formats. Of course, the amount of upward shift of a portion of curve 1 to curve 1" depends upon the degree of the urgency.

The priority thus obtained is relative and not absolute. Small formats are given an advantage, but this does not mean that large and medium formats will not be cut. On the average, however, small formats will be cut more rapidly. Urgency, or priority, is therefore taken care of but without departing from economic efficiency as the main criterion.

Other important contingencies, such as market trends, the progress of the packaging operations, restoration of synchronism between the rhythms of the various sections of the production line and so on, can also be allowed for by acting on the marginal cost prices of the pieces.

Practice of the process can also be subject to a restriction in cutting scheme preparation to allow for the conditions under which the cut pieces are to be handled. The order book pieces are intended to be grouped in a number of handling units after cutting. For glass pieces, the handling units can be boxes, containers, frames or stands. If the order book is large, the number of handling units, for instance, boxes, is also large. If schemes are prepared for the complete order book, the pieces which will be obtained after cutting are intended for all the boxes. However, all of the boxes cannot be simultaneously disposed along the end of the cutting line in loading positions, so that the gains provided by increased cutting efficiency are rapidly offset by the demands on the equipment and staff required to sort the pieces. If the complete production line is to have a satisfactory economic efficiency, the number of containers which are being filled simultaneously at the end of the cutting line must be limited, while maintaining the cutting pattern possibilities at a maximum.

It will be assumed that at a given time the order book lists a number of pieces intended for 500 containers numbered consecutively from 1 to 500. It will be assumed that the processing capacity along the end of the cutting line is ten containers, this latter number being determined by the available space and sorting facilities. Each container is intended to receive a particular number of pieces which are either of the same dimensions or different dimensions.

Figure 10:
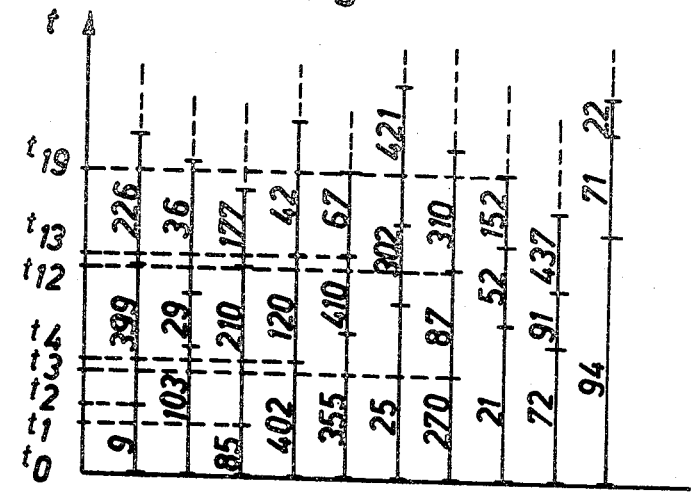
FIGURE 10 is a diagram used in explaining the present invention.

In a first stage, the cutting schemes are devised on the basis of pieces from the complete order book but with the restriction that the pieces are intended for a maximum of ten containers. The first scheme or schemes retained determines the ten containers to be loaded first. In FIGURE 10, these first ten containers are represented by their order numbers placed along the straight line segments at right angles to the horizontal line passing through $t_0$. This horizontal line is disposed alongside the output end of the line of delivery L.D. of the cut pieces. The length of the segment associated with each container number, each segment being delimited by short, horizontal marks, represents the time period required for the arrival of the pieces to fill the container. The various time periods are measured from the start of operations at time $t_0$ and are indicated by the vertical coordinates of FIGURE 10. It is assumed in FIGURE 10 that the ten containers were determined by the first scheme.

When the ten containers have been thus selected, the succeeding schemes to be retained can include only pieces intended for those ten containers which begin to be filled at the instant $t_0$, this condition being imposed until any of these ten containers has been completely filled. One such occurrence is indicated by $t_1$ in FIGURE 10 and corresponds to the completion of filling of container No. 85. The cutting schemes are then revised on the basis of the complete order book, but with the restriction that the pieces making up the new schemes consist solely of those intended for the other nine containers, which started to be filled at the time $t_0$ and which have not been completely filled at the time $t_1$, and for a single new container which replaces container No. 85. The particular cutting scheme retained therefore determines which container is to follow container No. 85 in the filling line. In the example in FIGURE 10, this next container is No. 210.

The same operation is carried out at the times $t_2$, $t_3$, $t_4$, etc., corresponding to the completion of filling of containers Nos. 9, 270, 402, etc., respectively, which are replaced on the filling line by containers Nos. 399, 87, 120, etc., respectively.

In the example illustrated, for example at the time $t_{12}$, containers Nos. 399, 210 and 87 are finished simultaneously. New cutting schemes can then be prepared on the basis of the complete remaining order book, and the scheme retained determines the selection of three new containers which succeed the completed containers. At each of the times $t_{13}$ and $t_{19}$, by way of further example, the particular cutting scheme retained selects two new containers, i.e., Nos. 42 and 67 at time $t_{13}$. Cutting logic is therefore fully used but cutting line capacity is never exceeded.

In order that cutting and loading in containers will not be slowed down by the time taken for a new container to move into filling position, it would be useful to know the sequence of the containers in the ten processing lines, as is shown in FIGURE 10, before cutting starts. This can be done by simulating the cutting of the order book items, which must be carried out without allowance for flaws in the actual material, under the same conditions as those existing during actual cutting. This simulation can be performed by the computer. For this simulation the computer can also produce imaginary flaws in a random, or any other, distribution, for instance in accordance with a Poisson distribution, and with any desired flaw concentration.

In some cases, glass is produced continuously 24 hours a day but cutting is carried out for only a part of the 24 hours. In this event, the glass strip or ribbon is systematically cut into sheets of predetermined dimensions, and twentyfour hours of sheet output are cut, for instance, during an 8-hour period.

Cutting is simulated to determine the container arrival order for the 8-hour period. A scheme similar to that of FIGURE 10 results, but with the single difference that the actual container filling times are different from the estimated times and the choice of a particular container may sometimes differ from that which was envisioned. However, we have found that the latter event occurs very rarely. If the computer is large enough, simulation can be performed simultaneously with actual cutting.

When the glass sheets are then actually cut, some filling lines have a higher filling rate than was estimated whereas other lines have rates lower than those estimated. This is because actual cutting takes into account actual flaws in the sheets. Some filling lines would therefore finish in less than 8 hours and others would take longer than the specified 8 hours. The rates of the various lines must therefore be equalized, so that all of the lines will finish substantially at the same time, at the end of the 8-hour period. This result can also be achieved by action on the cost-representing numerical values of the individual pieces.

It will be assumed, for example, that the processing line starting with container No. 9 is running too fast, so that the time $t_2$ required to finish container No. 9 is less than was estimated before cutting. If this rate is maintained for the processing of container No. 399, action is taken on the speed of this line. To this end, the value of the pieces intended for the next container in this line is reduced. This value, or values, is known from the container arrival order plan which was determined before cutting. The container concerned in this case is No. 226. Such modification of the marginal first cost price is effected in a manner similar to that described in connection with the establishment of priorities. When a line is running slower than anticipated, the marginal cost price of the pieces for such line is increased. The rate of advance of the containers in various lines of the group can therefore be controlled very readily.

A description will now be given, with reference to FIGURES 11a to 11f, of a simplified example of the program for a computer for working out the best cutting scheme, these figures thus also representing the layout of a suitable special computer for this purpose. The program is given in diagrammatic form and is concerned merely with the main operations for preparing the cutting scheme. Secondary operations, such as data storage and data read-in and read-out to and from various units during program operation are not shown in order not to unduly complicate the drawings and to facilitate the explanation of the novel features of the computing operation.

Also, the program shown is designed to cut a flaw-free glass sheet. Indications will be given in the description of the program as to when the need arises to take the coordinates of possible flaws into account. The invention must therefore not be considered as being limited to this exemplary program but covers programs containing the elements previously referred to.

Figure 11A:
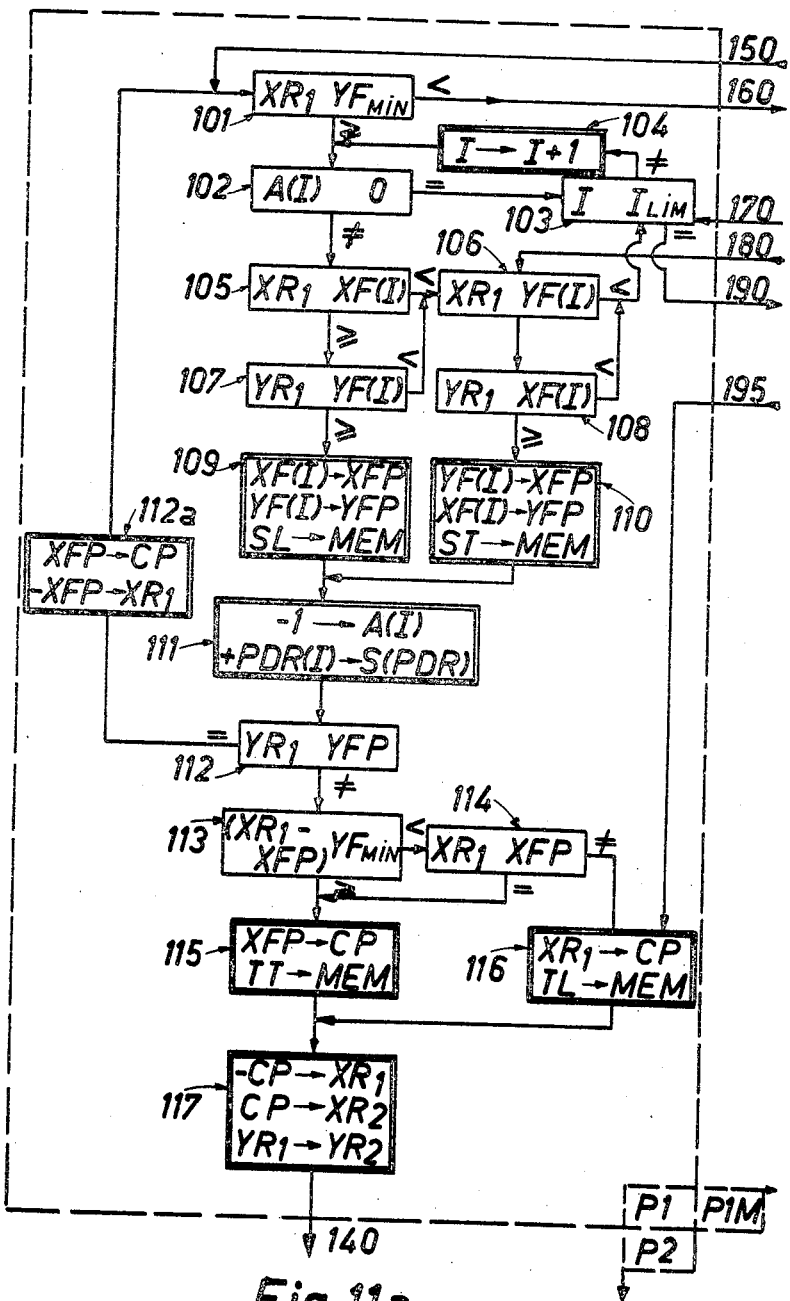
FIGURES 11a, 11b, 11c, 11d, 11e, 11f and 11g show the parts of a block diagram of a single cutting pattern program according to the present invention.
Figure 11B:
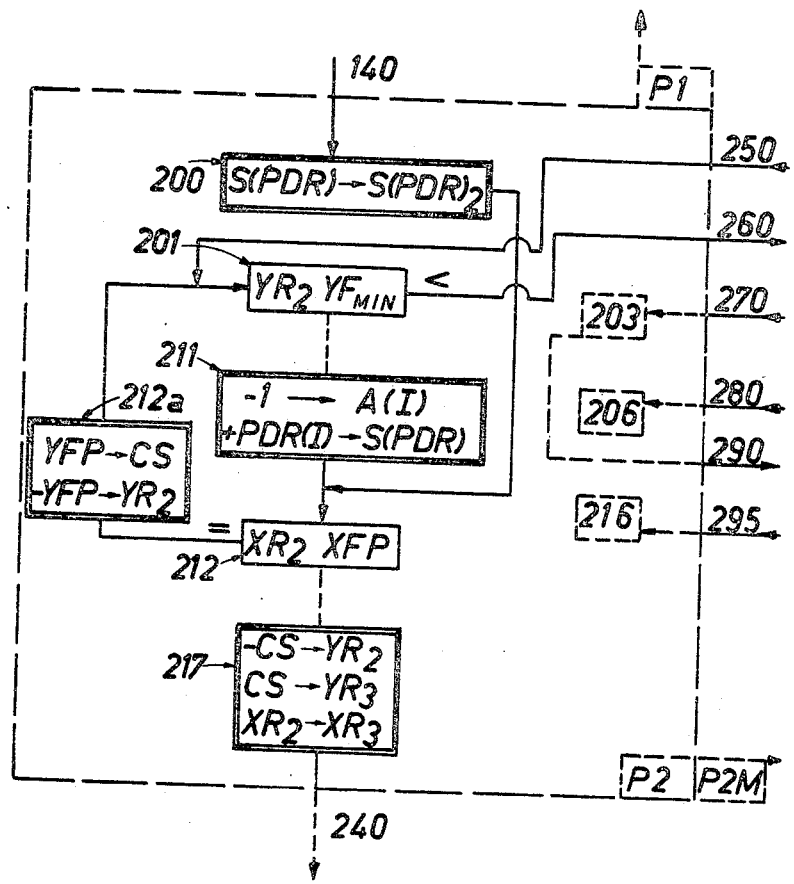
Figure 11C:
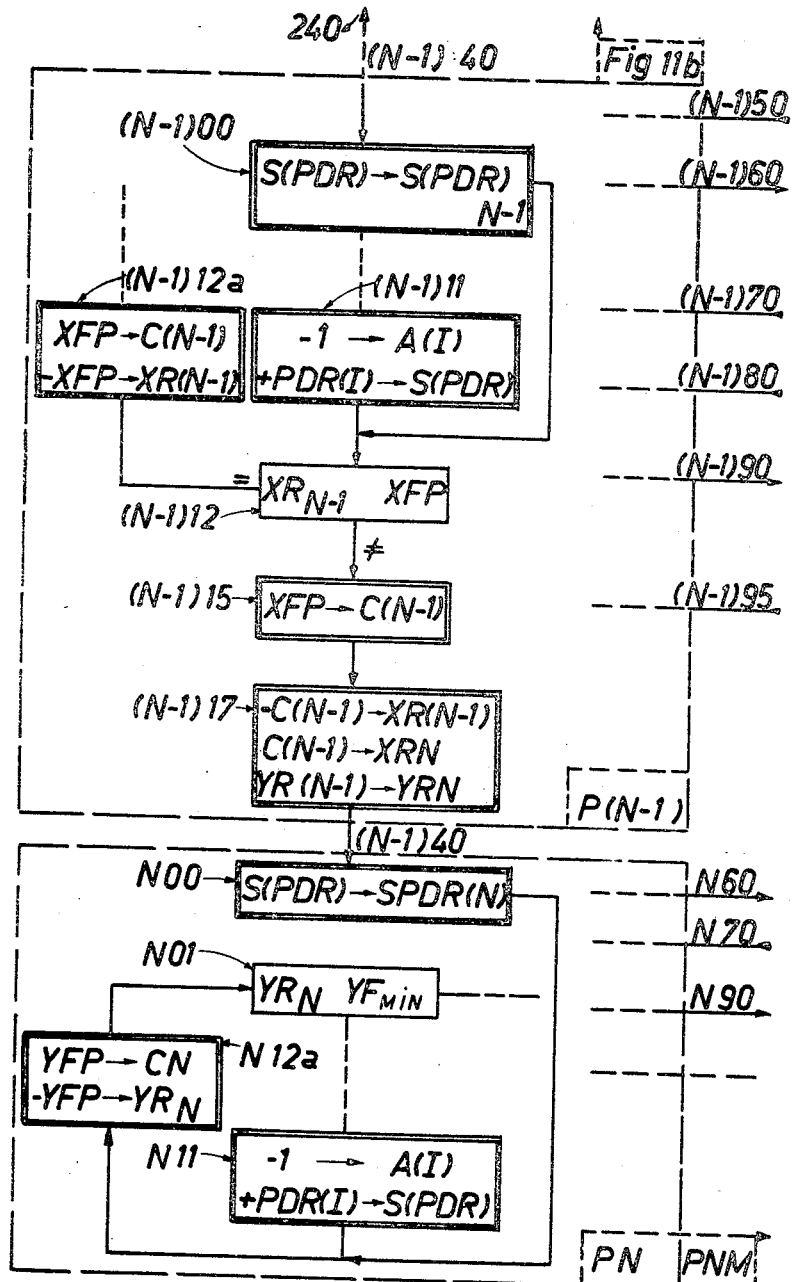
Figure 11D:
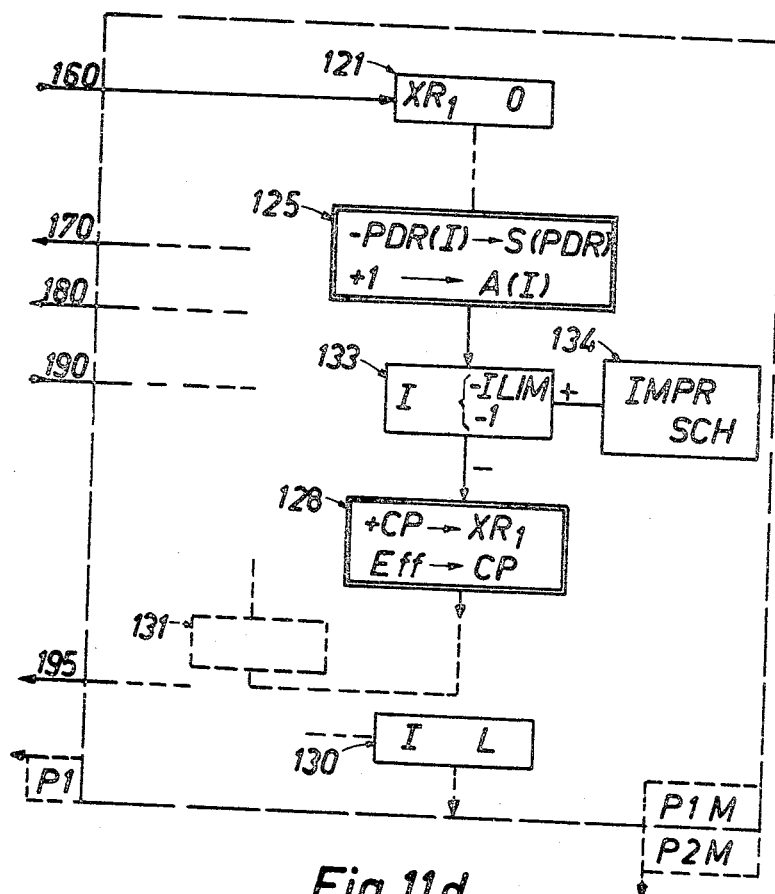
Figure 11E:
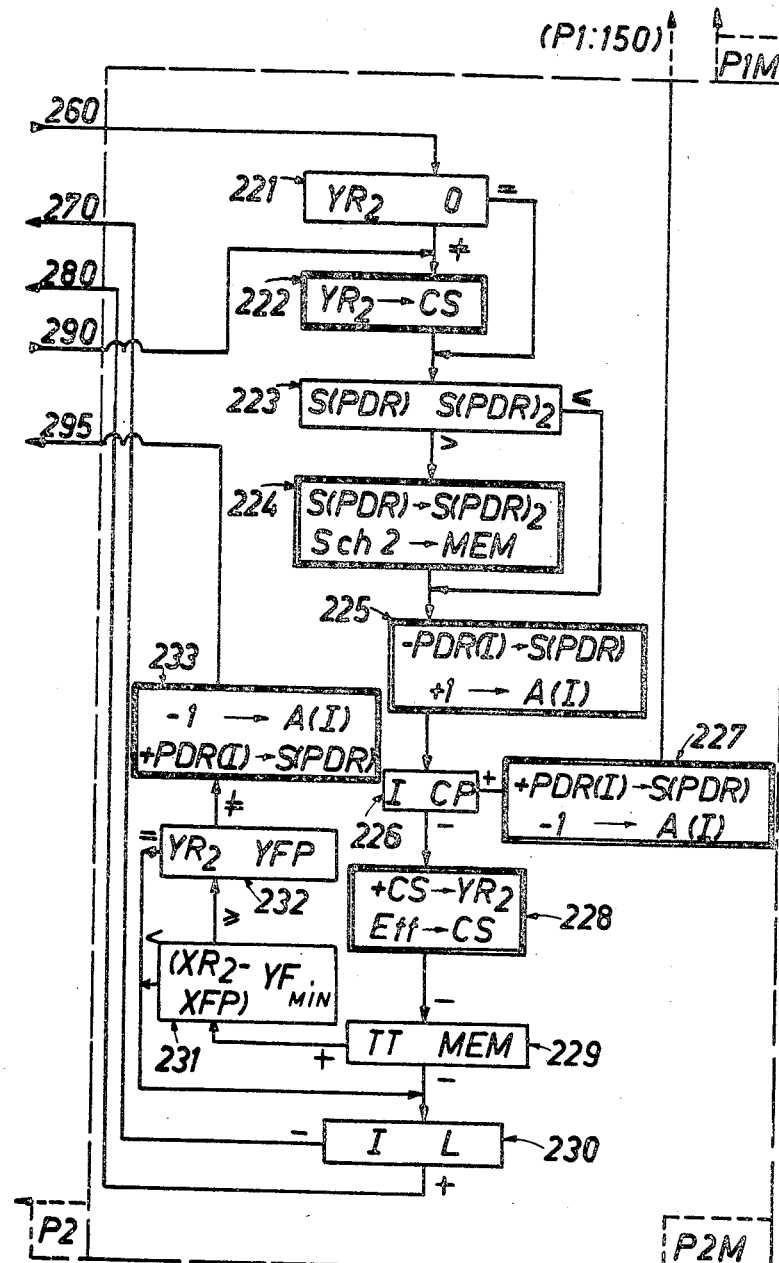
Figure 11F:
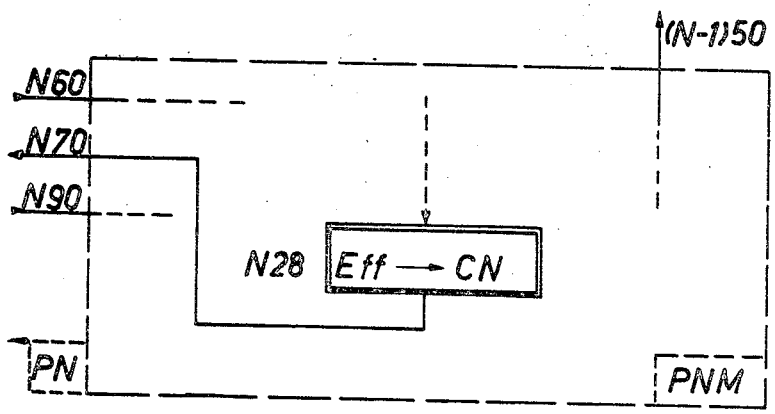
Figure 11G:
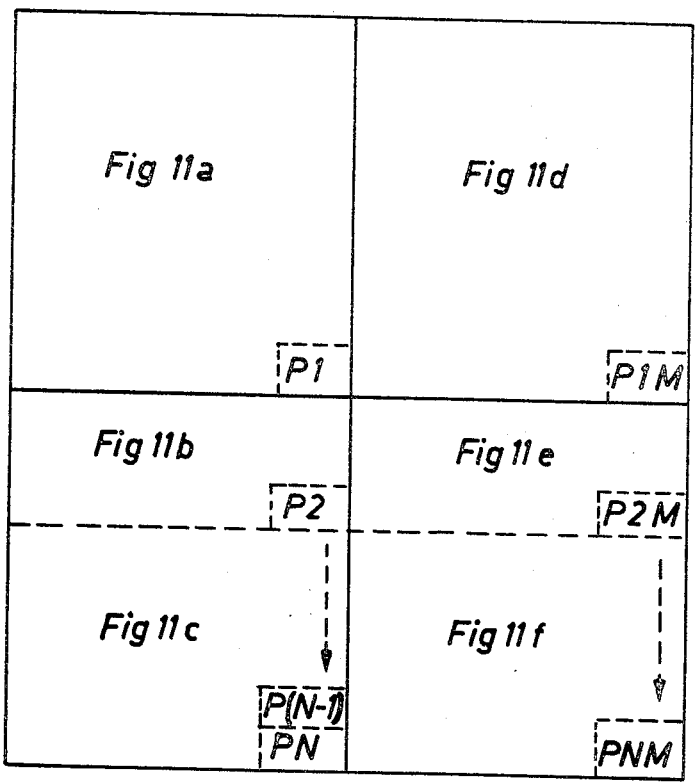

FIGURE 11g shows how FIGURES 11a to 11f are arranged relative to one another to give the complete layout of the program.

Data concerning the glass sheet—i.e., its dimensions, flaw coordinates, area and so on—and data concerning the pieces to be cut—i.e., their dimensions, the number of pieces of the same format, their cost prices, areas and so on—are assumed to be stored in a memory store not shown in the drawings.

Storage of the data relating to the pieces to be cut is such that the pieces are classified in decreasing order of cost-representing numerical values. The order book contents are stored in a number of lines which will hereinafter be given the reference I. Each line represents a desired format. The number of required pieces having this format is indicated opposite the line. This number is represented by A(I). The last line of the order book thus classified has the refernce $I_{LIM}$ and corresponds to the format having the lowest cost price. The same reference I is used, when the order book is classified in decreasing order of container values, to denote each order-book line.

The complete program is formed by two groups of partial programs P1, P2 . . . , P(N—1), PN and P1M, P2M . . . P(N—1)M, PNM. The first group contains the programs which create parts of the cutting scheme, and the programs of the second group modify some parts of the scheme.

The programs of each group which have the same index serve to determine cuts having a rank equal to the index. For instance, the programs P1 and P1M determine first-rank cuts, the programs P2 and P2M determine second-rank cuts, and so on. The partial programs of any single group are, as a rule, all the same except for modifications made to programs which are situated at the start or end of the group and which will be referred to in the description to be presented.

In the diagrams in FIGURES 11a to 11f, the single-frame rectangles represent logic operation elements, and the double-frame rectangles represent arithmetic and/or transfer operation elements, each of which can be constituted by a well-known arrangement.

To start with, there is presented a glass sheet to be cut whose dimensions are represented by $XR_1$ and $YR_1$. It will be assumed hereinafter that the glass sheet has its length disposed along the axis OX and its width along the axis OY of a coordinate system XOY. Similarly, each piece to be cut has a length XF and a width YF. To prepare the cutting scheme, a first piece must be placed on the sheet and the loaction of a primary cut determined. This operation is performed by the partial program P1 shown in FIGURE 11a. Such program is carried out by a first logic element 101 which compares $XR_1$ and $YF_{MIN}$, the latter representing the smallest dimension for a piece listed in the stored order book. The operations of removing the two data items from the store are not shown, but are well known in the art. If the comparison shows that $XR_1$ is less than $YF_{MIN}$, a shift is made to program P1M (FIGURE 11d) via connection 160. On the other hand, if the comparison shows that $XR_1$ is greater than, or equal to, $YF_{MIN}$, an element 102 scans the first line I of the order book store, and checks whether A(I) differs from zero, i.e., if pieces whose dimensions are indicated on such line are still required to be cut. If the answer is negative, i.e., if A(I) equals zero, a logic element 103 checks whether the scanned line I was the last line $I_{LIM}$ of the order book. If the answer is affirmative, a shift is made via connection 190 to the partial program P1M. If the answer is negative, a transfer element 104 gives an instruction to scan the next line I of the order book store.

As the order book lines are thus scanned in sequence, a line I will appear for which A(I) is other than zero. When this occurs, an element 105 compares sheet length $XR_1$ with the length XF(I) of the piece entered on this particular line I. If the length $XR_1$ is greater than this XF(I), a logic element 107 compares width $YR_1$ with the width YF(I) of that particular piece. If the comparison shows that $YR_1$ is greater than or equal to YF(I), this means that the piece of dimensions XF(I), YF(I) can be placed lengthwise on the sheet of dimensions $XR_1$, $YR_1$. An element 109 then decides to consider the width $YF(I)$ of such piece as the dimension along the OY axis, or as the YFP dimension. The piece is therefore considered to be placed lengthwise and this information is stored as SL, this storing being indicated by $SL \rightarrow MEM$ in the element 109.

If any of the comparisons made by the elements 105 and 107 gives any other result than the one just described, the elements 106 and 108 would be instructed to make similar comparisons for placing the piece transversely to the position described above. If the piece can be so placed transversely, an element 110 makes the decision and stores the indication ST. If the piece to be cut can not be placed transversely either, there is a return to the element 103, as indicated by the line at the right-hand sides of elements 106 and 108, for exploring a succeeding line I of the order book store.

When the decisions have been made either by the element 109 or by the element 110, an arithmetic operation element 111 subtracts 1 from the number $A(I)$ of pieces to be cut and adds the cost $PDR(I)$ of the piece retained to the total cost $S(PDR)$.

At this stage, the program P1 has determined the way in which the piece should be placed on the glass sheet for cutting. This determination has considered only the sheet dimensions $XR_1$ and $YR_1$, but has not considered flaws. To make allowance for the flaws, the number of elements similar to 105, 107 and 106, 108 must be increased sufficiently to compare $XF(I)$ and $YF(I)$ with the flaw coordinates which are also stored as dimensions along the coordinate axes OX and OY.

The choice of the first-rank cut required to remove from the glass sheet the piece located thereon now has to be made. Accordingly, a logic element 112 compares sheet width $YR_1$ with that dimension of the piece which extends along the OY axis and which is represented by YFP. If the two dimensions are equal, an arithmetic element 112a decides to take the dimension XFP to define the position along the OX axis of first-rank cut CP and subtracts XFP from $XR_1$. This means that the piece to be cut extends across the entire width $YR_1$ of the glass sheet and can be removed by just one first-rank cut. In this eventuality, there is a return to the logic element 101, and the panel still to be exploited is the initial sheet $XR_1$, $YR_1$, less the first piece $XF(I)$, $YF(I)$, or XFP, $YR_1$. For this new exploitation the values of $XR_1$ and $YR_1$ to be considered are respectively the difference value generated in element 112a and the width of the original sheet.

If the element 112 finds that there is a difference between $YR_1$ and YFP, this means that a second-rank cut will also be required to remove the first piece. However, before the position of this cut is determined, it is necessary to determine that location of the first-rank cut which will permit optimum utilization of the panel remaining after the second-rank cut since, as already stated, if the remainder can not be used, it must be made as small as possible. This optimum cut is determined by elements 113 to 116.

The element 113 compares the differences $(XR_1-XFP)$ with $YF_{MIN}$ on the basis of stored information fed thereto. If this comparison shows that the difference is greater than $YF_{MIN}$, i.e., that the remaining panel can still be used, the element 115 decides to use the length XFP to determine the position of the first-rank cup CP, and the transverse-cut indication TT, corresponding to CP, is stored in the memory MEM. If the comparison of the difference $(XR_1-XFP)$ with $YF_{MIN}$ shows that the difference is less than $YF_{MIN}$, $XR_1$ and XFP are compared in the element 114, and in the case of a difference, the element 116 decides to take the entire length $XR_1$ as determining the location of the first-rank cut CP, which cut thus coincides with the rear edge of the sheet. The element 116 also stores in the store MEM the lengthwise-cutting indication TL. In the program shown in FIGURES 11a to 11f, this lengthwise cut is considered as a second-rank cut.

When the element 114 finds that $XR_1$ and XFP are identical, there is a shift over to the element 115.

Once the first-rank cut has been determined, the second-rank cut is determined by the program P2. To shift to this program, the program P1 comprises an arithmetic element 117 which subtracts the distance along the OX axis of the first-rank cut CP from $XR_1$. This means that a first-rank panel whose dimensions are $(XR_1-XFP)$ along the OX axis and $YR_1$ along the OY axis remains to be exploited.

The element 117 also decides to use the distance of CP from the origin of OX as the dimnesion $XR_2$ along OX, and to use $YR_1$ as the dimension $YR_2$ along OY, of a new rectangle to be exploited by the program P2. The transfer from program P1 to program P2 is effected via the connection 140.

The program P2 shown in FIGURE 11b comprises all the elements of the program P1 and an extra element 200 at which the connection 140 terminates. Like elements of both programs have numerical references whose tens and units digits are identical and whose hundreds digit is the same as the number of the program to which they belong. This rule also applies to the other partial programs. Also, the letters X and Y used in the odd-number programs are replaced by Y and X, respectively, in the even-number programs.

The element 200 stores the S(PDR) of the scheme obtained by the program P1 in the store location $S(PDR)_2$ of the program P2.

From the element 200, there is a transfer to the logic element 212, the function of which is to compare $XR_2$ with XFP so as to determine whether the first-rank cut determined by the program P1 is or is not coincident with an edge of the primary panel. If $XR_2$ is equal to XFP, i.e., if the first-rank cut is coincident with such edge, an element 212a decides to use YFP to determine the location of the second-rank cut CS and subtracts YFP from $YR_2$, the element 117 having selected $YR_2$ to be equal to the height of the sheet. The substraction result delivered by the element 212a constitutes a new dimension $YR_2$ along the OY-axis of a panel of second rank to be exploited the dimension along the OX-axis $XR_2$ of which is equal to the dimension XFP defined by the program P1. This new measure of $YR_2$ is compared in the element 201 with $YF_{MIN}$, and thereafter the same procedure as the procedure of the program P1 is followed to position a piece for cutting in the rectangle of dimension $(XR_2, YR_2)$ until a transfer to element 217 is eventually made, whence a shift is made via a connection 240 to a program P3 which is not shown in FIGURE 11c. It should be noted that program P2 also includes elements comparable to elements 102 to 110, 111 and 113 to 116 of program P1 but the manner of connection of these elements is omitted from FIGURE 11b because their operation is identical to that of the corresponding elements of FIGURE 11a.

When the element 212 finds that $XR_2$ is different from XFP, $XR_2$ therefore being equal to $XR_1$, due to the passage of the program P1 through the elements 114 and 116, the logic sequence of the elements 212 to 217 is activated so as to determine the second-rank cut for removing the piece located by program P1. A third-rank cut is required to exploit the remaining rectangle and to remove a piece therefrom and this cut will be determined by a program P3 which is not shown. In this particular case, the program P2 therefore locates no pieces to be cut, so that the elements 201 to 211 do not operate.

All the partial programs which follow the program P2 and which determine cuts of consecutive ranks are identical to the program P2 except for the last two programs, namely $P(N-1)$, and PN, where N is the cut rank at which it is required to stop.

The partial program $P(N-1)$, shown in FIGURE 11c, is similar to the program P2, except that starting from the element $(N-1)12$, the elements corresponding to the elements 213, 214 and 216 (not shown in the drawings) do not reoccur. Their presence would lead to a cut of rank $(N+1)$ which is of course beyond the set limit.

The partial program PN is similar to the program P2, but in this case the elements corresponding to the elements 212 to 217 are missing, since there is no need to change over to any next program, the cuts of rank N being the final cuts permitted.

The group of partial programs P1 to PN has so far dealt with the construction of a first partial cutting scheme. The same is formed by the peices having the highest possible cost values, since the pieces are classified in decreasing order of cost, and the order book thus classified is scanned line by line, a piece being placed on the sheet for cutting whenever an order-book line is scanned which corresponds to a piece having dimensions compatible with the dimensions of the sheet or with the remainder thereof, and also being compatible with the flaw coordinates.

The complete program devises other schemes starting from this first partial scheme. First, some of the initial scheme must be eliminated. This operation is performed by the partial-program group P1M to PNM. Second, the eliminated part of the scheme is reconstructed in a different form. The new part of the scheme is developed by the partial-program group P1 to PN.

As in the case of program group P1 to PN, all the programs P1M to PNM are identical except for the programs P1M and PNM which are similar to the other programs in the group except for several minor modifications.

One program of the latter group, more particularly the program P2M is shown in FIGURE 11e. As is shown in FIGURE 11e, the transfer from program P2 to program P2M is effected via two connections 260 and 290. The first connection 260 extends from the element 201 of the program P2. Element 201 compares $YR_2$ with $YF_{MIN}$. Line 260 is activated when $YR_2$ is smaller than $YF_{MIN}$ i.e., when the remaining rectangle can not be exploited. Connection 290, which comes from element 203 of program P2, is activated when, as a result of the comparisons made by the elements 205 to 208 (not shown) of the program P2, no further piece can be positioned for cutting, and also when all the order-book lines have been scanned.

In the case in which the connection 260 gives a signal to the program P2N, a first logic element 221 checks whether $YR_2$ is equal to zero, i.e., whether the initial panel of dimensions $(XR_2, YR_2)$ left by the program P1 is nil or completely exploited. In the event of an affirmative reply, the program operation passes over to the element 223. When $YR_2$ is other than zero, an element 222 decides to take the location of $YR_2$ as a second-rank cut. As a rule, such cut coincides with the sheet edge. The same decision is made when program P2N is entered via connection 290.

Having made this decision, the element 223 compares the total cost S(PDR) of the pieces so far placed on the sheet with the total cost stored in the store $S(PDR)_2$. The total S(PDR) relates only to articles which have been placed on the sheet and which are removed therefrom only by a cut having a rank of at most two. If the S(PDR) is greater than the total stored in the store $S(PDR)_2$, an element 224 decides to store the total in the store $S(PDR)_2$ instead of the total previously stored therein. Also, the element 224 delivers to the store MEM second-rank cuts (marked Sch2) corresponding to the total S(PDR) stored in the store $S(PDR)_2$.

Since the example concerns the cutting of a sheet of glass, the element 223 compares only cost price totals. The area of the sheet is not included in the comparison since, as already stated, it is the same for each of the schemes.

In the case of a strip or ribbon, the element 223 is replaced by a first element which relates the cost price total to the total of the area used. This area total is actually the total of the areas of the panels obtained by first-rank cuts. A second element is provided to compare this relationship stored in the store $S(PDR)_2$. In the case of such a modified procedure, the element 117 of the program P1 also adds the area of each new, primary panel to the total of the areas of the previously determined primary panels. This operation is not performed in the programs P2 to PN.

Returning now to the program for a sheet, after the best scheme for second-rank cuts has been stored, or after it has been found that the total S(PDR) of the scheme is lower than the total stored in the store $S(PDR)_2$, an arithmetic element 225 performs a first operation to eliminate from the scheme the last piece placed. The element 225 subtracts the cost PDR(I) of that piece from the total S(PDR) and adds one unit to A(I), the number of pieces in order-book line I which must still be cut. A logic element 226 checks whether the piece to be eliminated required a first-rank cut CP when it was placed on the sheet of glass.

In the event of an affirmative reply $(+)$, an element 227 performs operations which are the reverse of those performed by the element 225, so as to retain such piece in the scheme. A shift is then made from element 227, via connection 150, to the element 101 of the program P1, which program tries to place a piece in the first-rank panel left unexploited. Operations will then be as hereinbefore described. If, however, such exploitation is impossible, a state of affairs which the element 101 would detect, an immediate shift is made, via line 160, to the partial program P1M which is shown in FIGURE 11d and which, through the agency of the elements 121 to 125 and 128 to 131, corresponding to the elements 221 to 225 and 228 to 231 of the program P2M, would proceed to remove the piece requiring such primary cut and to replace it with a piece having a lower value.

If the reply of the element 226 is negative $(-)$, indicating that the piece eliminated from the scheme required only a second-rank cut, element 228 adds the distance along the OY axis of the second-rank cut to $YR_2$ and erases this cut $(E\!f\!f\rightarrow CS)$. Element 229 then checks whether a transverse cut TT was stored for the piece when the same was originally placed in the scheme. This storage is the work of element 215 (not shown) of the program P2, based upon decisions taken by the elements 213 and 214 (not shown) with regard to the manner of cutting. If a transverse cut TT has been stored, the piece is cut in accordance with the alternate way of cutting and without the arrangement of the piece being changed. To this end, there is a shift from element 229 of program P2M to element 216 (not shown) of program P2, via connection 295. This shift can be made only if the comparisons made by the elements 231 and 232 give an appropriate result. The function of the element 231 is to check whether the new, or alternate, way of cutting is not going to lead to a remainder having one dimension smaller than the minimum order-book dimension $YF_{MIN}$, in which case the other dimension must be smallest.

Since this condition must have been respected when the scheme was devised, it is pointless to modify the manner of cutting.

The element 232 only serves to check whether the dimension YFP of the piece along the axis OY is equal to the dimension $YR_2$ along the axis OY of the exploited rectangle. If these dimensions are equal, there is no need to change the manner of cutting since the second way will not give any different result from the first one. This can be confirmed by turning back to FIGURE 2a and assuming that the edge bc of the piece to be cut is coincident with the sheet edge BC. The two ways of cutting in FIGURE 2a for such a piece give the same result. When the piece can be cut in some other way, element 233 removes the piece from the order book, reducing the number of pieces A(I) by 1, and adds the PDR(I) of such piece to the cost total S(PDR).

When any of the elements 229, 231 or 232, gives an inappropriate reply, a shift is made to the element 230, which checks whether the piece eliminated from the scheme had been placed lengthwise when the scheme was being worked out. This latter data item was stored either by the element 209 or by the element 210, both of which form part of the program P2 and which are not shown in the drawings.

If the piece eliminated from the scheme had been placed lengthwise, the operations of program P2M are shifted over by connection 280 to element 206 of program P2. From this element the scheme is reconstructed by endeavoring to place the piece transversely. If the element 230 finds that the piece has already been so placed, operations are transferred via connection 270 to element 203 of program P2 to pass to the next order-book line I, there being no need to try to place the piece lengthwise since, when the first scheme was being worked out by the program P2, transverse placing of the piece was considered only when legngthwise placing was found to be impossible, as a result of the operations carried out by elements 205 to 208 (not shown).

Program P1M, shown in FIGURE 11d, differs from program P2M in that the element 126 (not shown) which should correspond to the element 226 of the program P2M is replaced by an element 133 which checks whether the piece which is going to be eliminated from the scheme is a piece from the last orderbook line $I_{LIM}$ and whether such piece was placed originally on the glass sheet. In the event of an affirmative response, element 134 proceeds to print (IMPR) the best scheme SCH found, which is recorded in the stores MEM by the elements 124 to N24 of the partial programs P1M to PNM.

The only modification of the program PNM in comparison with the program P2M is the deletion of an element corresponding to 232 which, like the element 232, should check whether the piece to be removed has been placed lengthwise. Transverse placing of such article would lead to a cut of rank $(N+1)$ which must be excluded.

The preparation of the most advantageous cutting scheme by the complete program as hereinbefore described can be interrupted at any time so that, instead of the best scheme, the best scheme obtained before interruption can be used, for only the best cuts for each rank are stored and so can be immediately delivered from the memory store by simple read-out of the store MEM.

It will be understood that the above description of the present invention is susceptible to various modifications, changes and adaptations, and the same are intended to be comprehended within the meaning and range of equivalents of the appended claims.

What is claimed is:

1. In a method for cutting a sheet or strip of material into a number of rectangular pieces of predetermined dimensions based on the contents of an order book, which cutting takes the form af cuts of successive ranks $m$ starting from a first-rank cut extending across one entire dimension of the piece and finishing with an $n$th rank cut; each rank other than the first rank defining cuts perpendicular to those of the next lower-number rank and each rank cut extending between either two cuts of the next lower-number rank or one cut of the next lower-number rank and one edge of the sheet or strip, each cut dividing the sheet portion across which it extends into at least one panel and/or desired piece whose rank $m$ is the same as that of such cut, a procedure for development of a scheme for cutting the sheet or strip by the steps of:

placing, during development of the scheme, in an existing panel of the highest-number rank $m$, a piece whose dimensions are taken from the order book and whose dimensions are compatible with the coordinates of the flaws present in the sheet or strip, while leaving unused any panel of rank $(m-1)$ resulting from the placing of a desired piece of rank $m$ and requiring cuts of ranks $(m-1)$ and $m$; selecting, for such piece whose dimensions are taken from the order book those cuts having the ranks required to remove such piece from the sheet or strip; repeating said steps of placing and selecting for each successively produced panel of rank $m$ until reaching a cut of rank $n$, whereby an initial partial cutting scheme is thus devised by varying $m$ from 1 towards $n$;

then eliminating selected pieces consecutively in order of decreasing rank number, and thus in the reverse order of their placement, from the partial cutting scheme thus obtained; devising, for each restored panel resulting from the elimination of each piece, a cutting scheme based on an arrangement of at least one piece whose dimensions are taken from the order book, with allowance for the flaw coordinates, the rank af the cuts required to remove such at least one piece not exceeding $n$; and reiterating said steps of eliminating and devising for each consecutive piece of rank $m$, proceeding in a direction from ranks $n$ towards 1 from the highest-number rank attained in the design of the initial partial cutting scheme;

deriving, during each elimination of a piece of rank $m$, whenever such elimination affects a piece whose fabrication required a cut of rank $(m-1)$, an initial partial cutting scheme, and modifying the same for any panels or rank $(m-1)$ which had remained unused, by repeating said steps of placing, selecting, repeating, eliminating, devising and reiterating for each such unused panel before eliminating such piece of rank $m$ and before devising cutting schemes for the restored panel resulting from the elimination of such piece $m$; and cutting the sheet or strip in accordance with at least some part of a cutting scheme thus obtained.

2. A method as defined in claim 1 wherein each piece to be cut is assigned a numerical value representing its cost and the sheet or strip is cut in accordance with at least some part of that scheme for which the ratio between the sum of the numerical values representing the costs of the pieces in the scheme and the total sheet or strip area used is the greatest.

3. A method as defined in claim 2 wherein the initial partial cutting scheme incorporates those order book pieces having the highest possible cost-representing numerical values.

4. A method as defined in claim 2 comprising the initial step of arranging the order of pieces listed in the order book, and which are intended for an unused panel resulting from the removal of one piece, basically according to descreasing cost-representing numerical values.

5. A method as defined in claim 4 wherein: all of the pieces are arranged in the order book in order of decreasing numerical value; said step of placing is carried out by scanning the order book line by line to locate the piece having the highest numerical value whose dimensions are compatible with those of the existing panel; and said step of devising is carried out by scanning the order book line by line, starting from the corresponding, eliminated piece, to locate at least one piece to form the corresponding combination.

6. A method as defined in claim 4 wherein: the pieces are listed in the order book according to handling units and in order of decreasing numerical value in each such unit, and the units are arranged in decreasing order of the mean numerical value of the pieces included in each unit; said step of placing is carried out by scanning the order book line by line and from one unit to the next to locate the first piece listed whose dimensions are compatible with those of the existing panel; and said step of devising is carried out by scanning the order book line by line, starting from the unit following that which contains the corresponding eliminated piece, to locate at least one piece to form the corresponding combination.

7. A method as defined in claim 4 wherein said steps of placing and devising are each carried out by scanning the order book line by line to locate a suitable piece and wherein the first such scanning of each said step is carried out so as to locate only those pieces which have at least one substantially common dimension with the panel on which they are to be located.

8. A method as defined in claim 1 wherein said step of selecting is carried out for determining at least some of the possible ways of cutting out such piece without changing its position.

9. A method as defined in claim 1 wherein, for modifying an initial partial cutting scheme, said step of placing is carried out for determining at least several of the ways in which a given piece can be placed so as to be compatible with any flaws present in the sheet or strip.

10. A method as defined in claim 1 wherein, when said step of placing leads to an unused panel having one dimension smaller than the smallest dimension listed in the order book, said step of selecting is carried out so as to minimize the other dimension of such remaining panel.

11. A method as defined in claim 1 wherein the initial first-rank panel is disposed along the front edge of the sheet or strip and the remaining first-rank panels are disposed adjacent one another and adjacent the initial first-rank panel.

12. A method as defined in claim 1 wherein, for said step of cutting, the first-rank cuts are made transversely to sheet or strip length and are limited to that part of the sheet or strip for which the flaw coordinates are known.

13. A method as defined in claim 1 wherein said step of cutting is carried out by making the first-rank cuts transversely to sheet or strip length, which cuts are limited in number.

14. A method as defined in claim 13 wherein said step of cutting the sheet or strip is carried out in accordance with that part of the particular cutting scheme obtained which covers at least some of the first-rank panels, whereafter the other part of the particular cutting scheme obtained is abandoned and all of said scheme-determining steps are repeated for the uncut part of the sheet or strip.

15. A method as defined in claim 1, comprising the added step of limiting, in the case of the unused panel resulting from elimination of a piece, the number of cutting schemes devised by combinations of articles from the order book.

16. A method as defined in claim 1 comprising the steps of limiting the time during which the cutting schemes are devised, and retaining only one of the cutting schemes obtained during such time.

17. A method as defined in claim 6 wherein said step of devising is carried out by using pieces listed in a limited number of portions of the order book.

18. A method as defined in claim 17 wherein each order book portion relates to a corresponding handling unit provided for handling selected finished pieces, all such handling units together forming a handling group.

19. A method as defined in claim 17 wherein, when all the pieces of one order book portion have been cut, that portion is replaced by a new portion.

20. A method as defined in claim 1 wherein: the pieces are grouped in the order book according to handling units; said steps of placing and devising are carried out using pieces only from a predetermined number of selected handling units; and each successive scheme which is obtained is made up only of pieces grouped in those handling units included in the immediately preceding scheme and pieces included in additional handling units whose number is limited to the difference between the predetermined number of handling units and the total number of handling units carried over from the preceding scheme.

21. A method as defined in claim 20, wherein after all of the pieces grouped in one handling unit have been cut, the pieces grouped in a further handling unit are made available for the preparation of cutting schemes.

22. In a method for cutting a sheet or strip of material into a number of rectangular pieces of predetermined dimensions based on the contents of an order book, which cutting takes the form of cuts of successive ranks $m$ starting from a first-rank cut extending across one entire dimension of the piece and finishing with an $n$th rank cut; each rank other than the first rank defining cuts perpendicular to those of the next lower-number rank and each rank cut extending between either two cuts of the next lower-number rank or one cut of the next lower-number rank and one edge of the sheet or strip, each cut dividing the sheet portion across which it extends into at least one panel and/or desired piece whose rank $m$ is the same as that of such cut, a procedure for development of a scheme for cutting the sheet or strip by the steps of:

placing, during development of the scheme, in an existing panel of the highest-number rank $m$, a piece whose dimensions are taken from the order book and whose dimensions are compatible with the co-ordinates of the flaws present in the sheet or strip, while leaving unused any panel of rank $(m-1)$ resulting from the placing of a desired piece of rank $m$ and requiring cuts of ranks $(m-1)$ and $m$; selecting, for such piece whose dimensions are taken from the order book those cuts having the ranks required to remove such piece from the sheet or strip; repeating said steps of placing and selecting for each successively produced panel of rank $m$ until reaching a cut of rank $n$, whereby an initial partial cutting scheme is thus devised by varying $m$ from 1 towards $n$;

then eliminating selected pieces consecutively in order of decreasing rank number, and thus in the reverse order of their placement, from the partial cutting scheme thus obtained; devising, for each restored panel resulting from the elimination of each piece, a cutting scheme based on an arrangement of at least one piece whose dimensions are taken from the order book, with allowance for the flaw coordinates, the rank of the cuts required to remove such at least one piece not exceeding $n$; and reiterating said steps of eliminating and devising for each consecutive piece of rank $m$, proceeding in a direction from ranks $n$ towards 1 from the highest-number rank attained in the design of the initial partial cutting scheme;

deriving, during each elimination of a piece of rank $m$, whenever such elimination affects a piece whose fabrication required a cut of rank $(m-1)$, an initial partial cutting scheme, and modifying the same for any panels of rank $(m-1)$ which had remained unused, by repeating said steps of placing, selecting, repeating, eliminating, devising and reiterating for each such unused panel before eliminating such piece of rank $m$ and before devising cutting schemes for the restored panel resulting from the elimination of such piece $m$; and cutting the sheet or strip in accordance with at least some part of a cutting scheme thus obtained, wherein said procedure is carried out by a computer comprising at least one memory store for storing data relating to the sheets or strips, the coordinates of flaws in such sheets or strips, the dimensions and cost value of each piece listed in the order book, and any limitations imposed on the steps of said method;

logic circuits operatively associated with said store for determining various possible cutting schemes on the basis of data derived from said store;

adding circuits operatively associated with said logic circuits for determining the total cost value of each cutting scheme determined;

comparator circuits operatively associated with said adding circuits for comparing the highest values of each successive cutting scheme with the previously obtained highest cutting scheme value; and an output memory store operatively associated with said comparator circuits and said logic circuits for storing the highest value scheme thus far obtained and for delivering, at any desired time, the information relating to such scheme.

References Cited

UNITED STATES PATENTS

| 3,205,740 | 9/1965 | Groves et al. | 83—71 |
| 3,246,550 | 4/1966 | Galey et al. | 83—71 X |

ANDREW R. JUHASZ, Primary Examiner

JAMES F. COAN, Assistant Examiner

U.S. Cl. X.R.

83—7, 71